United States Patent [19]
Sharpe et al.

[11] Patent Number: 5,898,834
[45] Date of Patent: Apr. 27, 1999

[54] SYSTEM, METHOD, AND MEDIUM FOR CONTROL OF OBJECTS IN A MULTI-PLATFORM ENVIRONMENT

[75] Inventors: Benjamin W. Sharpe; Nathan W. Dwyer, both of Seattle, Wash.

[73] Assignee: Starwave Corporation, Bellevue, Wash.

[21] Appl. No.: 08/698,697

[22] Filed: Aug. 16, 1996

[51] Int. Cl.[6] .................................................. G06F 15/16
[52] U.S. Cl. ............................... 395/200.31; 395/200.34; 395/200.47
[58] Field of Search ......................... 395/200.34, 200.35, 395/200.47, 200.78, 200.31, 200.59; 707/10, 8, 200, 201, 204, 202

[56] References Cited

U.S. PATENT DOCUMENTS

| | | | |
|---|---|---|---|
| 5,206,934 | 4/1993 | Naef, III | 395/200.34 |
| 5,265,261 | 11/1993 | Rubin et al. | 395/200.62 |
| 5,428,799 | 6/1995 | Woods et al. | 395/725 |
| 5,481,721 | 1/1996 | Serlet et al. | 395/700 |
| 5,561,803 | 10/1996 | Kilis | 395/700 |
| 5,664,207 | 9/1997 | Crumpler et al. | 395/766 |
| 5,682,478 | 10/1997 | Watson et al. | 395/200.34 |
| 5,781,633 | 7/1998 | Tribble et al. | 380/25 |

OTHER PUBLICATIONS

Owen Rees et al, "A Web of Distributed Objects," http://www.w3.org/Conference/WWW4/Papers/851,Dec.11,1995.

Marc H. Brown et al, "Distributed Active Objects," http://www5conf.inria.fr:80/fich_html/papers/P13/Overview.html, May 6, 1996.

*Primary Examiner*—Mehmet B. Geckil
*Attorney, Agent, or Firm*—Hale and Dorr LLP

[57] ABSTRACT

A diversified processing system and associated method are disclosed for updating at least one remote computer platform with an action occurring on a local computer platform. The disclosed system and method minimizes the amount of locally generated information that needs to be transferred across a network so as to maintain on a remote computer platform a copy of what has occurred locally. To minimize the information sent between platforms, each platform may contain items, referred to as instances, which respond to various types of commands. The types of instances include master, proxy, and free instances. Master instances and proxy instances relate to the same item located on different platforms. Each master instance keeps its related proxy instances current with its status by transmitting its changes between platforms to its related proxy instances. Free instances respond to changes occurring preferably on a single platform. By minimizing the amount of information that needs to be transmitted between platforms, the bandwidth consumed to update various platforms is reduced.

66 Claims, 19 Drawing Sheets

LOCAL SENDING/RECEIVING RULES

NETWORK SENDING/RECEIVING RULES

| TIME | t | t+1 | t+2 | t+3 | t+4 |
|---|---|---|---|---|---|
| $C_1$ 1201 | MASTER OF Ch.1,Ch.3 | BROADCASTS RELEASE TO Ch.1,Ch.3, BROADCASTS CLAIM OF Ch.M | RECEIVES MESSAGE THAT MASTER OF Ch.M BELONGS TO $C_1$ | MASTER OF Ch.M | MASTER OF Ch.M |
| $C_2$ 1202 | MASTER OF Ch.2 | RELEASE RECEIVED OF PROXY OF Ch.1 AND Ch.3 | RECEIVES MESSAGE THAT MASTER OF Ch.M BELONGS TO SERVER | BROADCASTS CLAIM OF Ch.3 | RECEIVES MESSAGE THAT MASTER OF Ch.3 BELONGS WITH $C_2$ |
| SERVER'S CHAPTER 1 1203 | PROXY (MASTER WITH $C_1$) | RELEASE RECEIVED FROM $C_1$ AND BECOMES MASTER INSTANCE OF Ch.1 | TRANSMIT MESSAGE THAT MASTER IS WITH SERVER | MASTER | MASTER |
| SERVER'S CHAPTER 2 1204 | PROXY (MASTER WITH $C_2$) | PROXY (MASTER WITH $C_2$) | PROXY (MASTER WITH $C_2$) | PROXY (MASTER WITH $C_2$) | PROXY (MASTER WITH $C_2$) |
| SERVER'S CHAPTER 3 1205 | PROXY (MASTER WITH $C_1$) | RELEASE RECEIVED FROM $C_1$ AND BECOMES MASTER OF Ch.3 | TRANSMITS MESSAGE THAT MASTER IS WITH SERVER | RECEIVES CLAIM FROM $C_2$ | TRANSMITS MESSAGE THAT MASTER BELONGS WITH $C_2$ |
| SERVER'S CHAPTER M 1206 | MASTER | RECEIVES CLAIM FROM $C_1$ | TRANSMITS MESSAGE THAT MASTER BELONGS TO $C_1$ | PROXY (MASTER WITH $C_1$) | PROXY (MASTER WITH $C_1$) |

FIG.13

ACTION PROCESSING

|  |  | FROM | | |
|---|---|---|---|---|
|  |  | $M_1$ | $P_1$ | $F_1$ |
| TO | $M_2$ | YES | NO | YES |
|  | $P_2$ | YES | NO | YES |
|  | $F_2$ | YES | YES | YES |
|  | $M_1$ | YES | NOT APPLICABLE | YES |
|  | $P_1$ | NOT APPLICABLE | YES | YES |
|  | $F_1$ | YES | YES | YES |

FIG.18A

|  |  | FROM | |
|---|---|---|---|
|  |  | $M_1$ | $P_1$ |
| TO | $M_2$ | YES | NO |
|  | $P_2$ | YES | NO |
|  | $M_1$ | NOT APPLICABLE | YES |
|  | $P_1$ | YES | NOT APPLICABLE |

FIG.18B

SYSTEM, METHOD, AND MEDIUM FOR CONTROL OF OBJECTS IN A MULTI-PLATFORM ENVIRONMENT

BACKGROUND OF THE INVENTION

1. Technical Field

This invention relates generally to diversified processing of information across a network. More particularly, the invention provides an enhanced way of updating remote platforms with update information without consuming significant amounts of bandwidth.

2. Related Information

One outgrowth of the advancement of computers is the proliferation of computer networks. Computer networks transmit information from a first computer platform to at least a second computer platform. Regularly, multiple users (and multiple computer platforms) interact in a common network environment. Some environments that require management of large amounts of information received from various users include multi-user games, common processing of documents or spreadsheets, and design of programs. The goal of allowing multiple users to enter information concerning a single item (game, document, program, spreadsheet, program) is to provide those users with the ability to update the single item and to give the users knowledge of how others are affecting that item.

Previous attempts have been made to provide an environment where each user is made part of a larger group of users. These attempts have included transmitting every change and resulting action initiated by a user to all other users. While this approach worked fine for a few users, as many more users joined in, the underlying network of computers would clog and fail.

In the approach described above, in an effort to keep all of the other users' systems updated to precisely what was happening on a given user's system, each user's system had to transmit long series of data packets containing each and every change made to each user's system. When more than a few users' systems started exchanging large amounts of information, the "bandwidth" consumed by the continuous transmissions of large amounts of information between the users would reach a point at which the underlying network would suffer. Commonly, the underlying network would not be able to handle the amount of information that needed to be constantly transferred.

Partial solutions included using faster computers, faster connections to the network (faster modems or area networks), or by limiting the number of users who could exchange information to a select few. These solutions temporarily allowed the underlying network to increase the number of users engaged in the common environment through better handling of the information transferring between the various users. However, as the environments in which the users were engaged became more complex, more information needed to be conveyed between the various users' systems. Accordingly, the underlying network would again be stressed for bandwidth.

SUMMARY OF THE INVENTION

To overcome the aforementioned problems, a system, method, and medium are disclosed which break down all interactive items into "objects." These objects represent the items that can be changed within a given network environment. The representation of an object on a given user's platform is called an "instance" of the object. The combination of all instances on a given user's platform is called a "model." This model represents this user's view of the collection of objects.

When a first instance of an object on a given platform is altered (e.g., moved or transformed in some way) (which may cause instances of other objects on that platform to also be altered), instead of transmitting the altered status of all the instances, embodiments of the present invention contemplate that the "underlying action" is transmitted to the other platforms, causing the alteration of the first and, possibly, other instances on the receiving users' platforms. At least some embodiments contemplate the transmission of the "underlying action," including the transmission of the occurrence of an action, to another platform. By then implementing the "underlying action" on the other "receiving" platforms, the status of all instances on the given (originating) user's platform can be conveyed to all of the other platforms. The transmission and later implementation of the "underlying action" reduces the bandwidth consumed for updating the various platforms by the platforms' interconnecting transmission system.

To aid in transmitting the underlying actions which change a particular instance (and potentially then affect others), the other platforms contain a representation of this first instance. In effect, three types of instances exist: master instances, proxy instances, and free instances.

A master instance controls what happens to the other corresponding instances (i.e. it controls the state of the object it represents) across all platforms.

A proxy instance is a "corresponding" instance representing the master instance on another platform. A proxy instance does not change the object represented by it and its associated master instance, but rather only responds to commands from its associated master instance. As a proxy is controlled by its related master instance, the combination of master instances and proxy instance can be considered "related instances."

A free instance is an instance having no master, but which instead responds to locally generated actions on a given platform.

In one example of the embodiments contemplated by the present invention, a first user inputs an action to its local platform to cause an instance under the first user's command to perform a certain action (which, in turn, causes other "associated results" to occur to other instances on the first user's local platform). In this case, the representation of the controlled object is assumed to be a master instance on the first user's platform. To update the related proxy instances representing the first user's master instance on other platforms, the first user's platform transmits the input action to other users' platforms, where the proxies, in turn, implement the input action. All further processing of the input action (which produces the aforementioned "associated results" that follow from the input action) is carried out locally on the other users' platforms. An example of such further processing can be reformatting a document after having received a carriage return representing an action.

Another example can be determining what items are affected when a character is moved in response to an input action. If a second master instance on the same or a second platform is affected by the performed action, then the second master instance will implement its responsive action. To update the proxy instances of the second master instance, the second platform transmits the responsive action to its proxy instances.

In general, it can be seen that by transmitting input actions and responses across a network and then allowing each local platform to implement the consequences of those actions, the network is relieved from transmitting all updates of each and every change in every instance between all platforms. This reduction in network bandwidth consumed allows for increasing the number of interacting users.

Other features and advantages will become evident through the following detailed description, figures and claims.

BRIEF DESCRIPTION OF THE DRAWINGS

FIG. 13 shows the interchange and processing of information of the fourth example.

FIGS. 18A and 18B show local and network sending matrices as contemplated by embodiments of the invention.

DETAILED DESCRIPTION

Figure 1A:
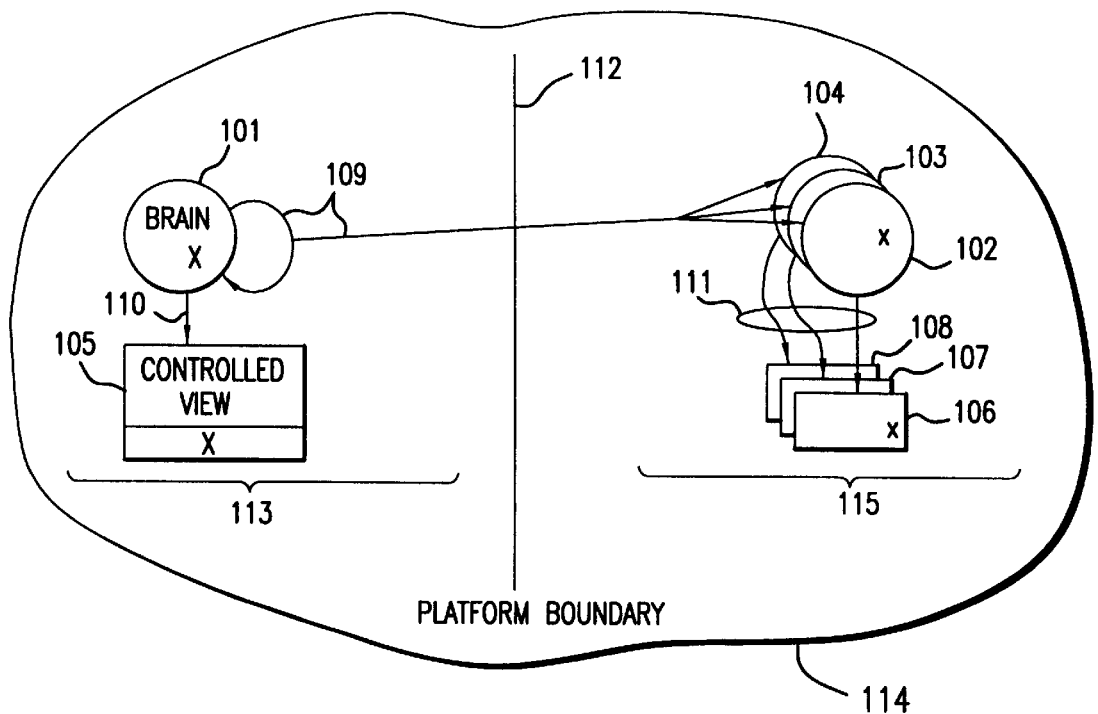
FIGS. 1A and 1B shows a basic operating concept of embodiments of the invention.

FIG. 1A relates to a given user's view of the overall scheme as contemplated by embodiments of the present invention. The scheme can be represented by a "world" 114 of platforms 113, 115. Each user can have direct control over at least one platform. Each user's view of the world is referred to as a "model." In FIG. 1A, a user has platform 113 which includes both a "brain" 101 and a "controlled view" 105 controlled by brain 101. View 105 can be a bit mapped image as displayed on a user's monitor. As its name suggests, brain 101 is a "controlling influence" which means it controls what happens in its own local platform, or, in other words, in its own model.

The world is composed of "objects." These objects can be characters, documents, spreadsheets, or any other item. Each brain's representation of these objects is referred to as an "instance." Accordingly, what each user sees in its controlled view 105, 106, 107 or 108 are sets of instances representing the objects of the world.

As a character moves and interacts with the other objects in the world as represented in the model on platform 113, the rest of the platforms 115 need to be updated to the actions of the character. In FIG. 1A, an object is represented by X. The representation of the object X in each brain 101, 102, 103, and 104 is an instance of X. Here, based on an input, brain 101 tells X to do something. This in turn is conveyed to the other instances of X, as represented by message 109. Here, the action received by brain 101 is implemented through message 109. Message 109 can be referred to as the implementation of the received action. Message 110 contains the update for the controlled view 105.

Figure 1B:
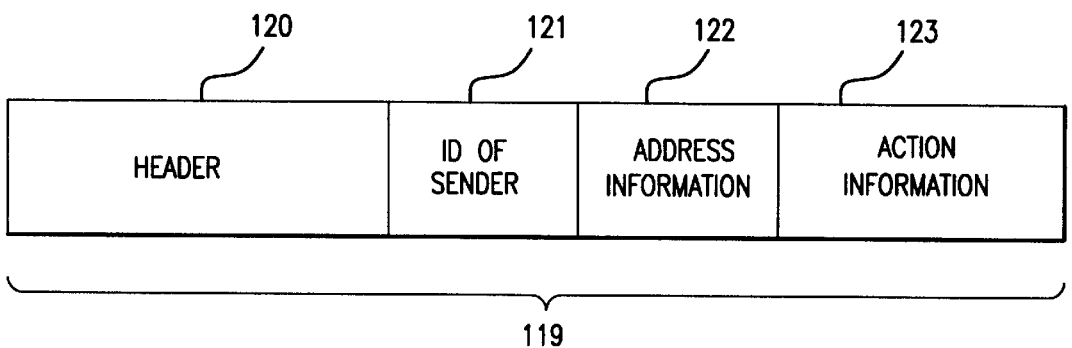

As brain 101 controls the actions of X, the other brains 102, 103, and 104 with controlled views 106, 107 and 108 need to be updated to the actions of X as well. To reduce the bandwidth consumed by the updates of the actions of X, embodiments of the present invention contemplate that the amount of information about X that needs to be transmitted to brains 102, 103 and 104 can be minimized. Referring to FIG. 1B the message information 119 transmitted to brains 102, 103, and 104 include header information 120 (identifying the message as a message related to object control), sender information 121 (identifying the type of object sending the message), address information 122 (identifying to the receiving platform where the affected instance is stored in the receiving platform's memory), and action information 123 (the action to be potentially implemented by the receiving instance). In this FIG. 1A, only message 109 is transmitted to the other brains across platform boundary 112. Next, each brain processes the action of X as indicated in message 109. Finally, each brain 102, 103, and 104 updates the controlled views 106, 107 and 108 through message 111.

In this example, brain 101 controlled the actions of X. In brain 101, the instance of X is considered a "master" instance. Embodiments of the present invention contemplate that there is one master instance of an object in a world. While the location of the master can change, the number of masters does not. Brains 102, 103, and 104 update themselves to mirror the actions of the master instance without exerting any control over it. In brains 102–104, the instances of X can be considered "proxy" instances. Master instances are instances controlled by the brain in which they are resident. Proxy instances are instances which, while represented on other platforms (here 115), respond to altering commands from their related master instances.

On occasion, a proxy instance will receive an action from an instance other than its master. When, e.g., a command from an unrelated master instance or another proxy instance does not alter the state of the proxy instance, the proxy instance can implement the command. As will be described in greater detail below, this implementation may be simply a minor indication by the proxy stance that it has received an action from another instance. For example, a non-altering action may include changing a color or size of the proxy instance in a controlled view. Alternatively, if the proxy cannot implement the received command or action, it ignores the action and continues to wait until it receives an action or command to which it can respond. If the action cannot be presently implemented and is from a master or free instance, then the receiving proxy forwards the received action to its related master for determination whether to implement the received action. The proxy forwards the received action and indicates in the header information 120 that the following action 123 was received by a proxy and the action 123 attempts to change the proxy's state.

Finally, while not shown in FIG. 1A, instances which only receive locally generated actions are considered "free" instances.

When considering whether an instance should be designated as a "free" instance or as a "master/proxy" instance, the question of "how important is the state of the instance among the various platforms to the proper functioning of the scheme?" needs to be resolved. Instances which do not affect or are not considered relevant to the actions of actors on other platforms are generally designated as free instances. For example, the position of a switch may be designated as not affecting or relevant to actors on other platforms and so may be designated as a free instance. Instances which affect the actions of actors on other platforms (who rely on the specific state of the instance) are generally designated as master/proxy instances. For example, in a given world scheme, there may be a limited number of items in existence in the world (e.g., hats). The claiming of any one (hat) by another instance (someone picking up the hat) precludes a third instance (another person) from simultaneously possessing the same item (the same hat). Accordingly, in this example, the hat may be designated as a "master/proxy" instance (a master on one platform, and proxies on all other platforms).

An alternate result occurs when there are an unlimited number of objects one can acquire (e.g., an unlimited number of hats at a given location or an endless supply of water in a fountain). In the example of an unlimited number of hats available at a given location, when one object acquires a hat, other objects are not precluded from also acquiring a similar hat. Another example includes taking a drink from a fountain where, even though a first object takes a drink from the fountain, a second object may also take a drink from the fountain without fear of the water supply being depleted. As these instances (e.g., unlimited number of hats or water fountain) operate independently of their counter parts on other platforms, they may be designated by a "free" instance on all platforms. In due course, the "master/proxy" proxy instances interacting with these free instances will be updated, as will be discussed in greater detail below.

To prevent multiple actions from uncontrollably affecting an object represented by master and proxy instances, embodiments of the present invention contemplate that all actions affecting the master are coordinated on a single platform. This then allows, for example, the following situation to occur: if two actions affecting a master instance were transmitted over a network, the master instance would respond to the received actions in the order in which the actions were received. In response, the master instance would update all of its proxies in due course. This means that while there might be delays in the updates of the proxies, (due to, for example, transmission delays) they will eventually be updated correctly to reflect the state of the master instance.

Embodiments of the present invention contemplate that there are six message sending rules, as follows:
1) Free instances can send messages to any kind of instance;
2) Free instances can receive messages from any kind of instance;
3) Master instances can send messages to and receive messages from any kind of instance;
4) Proxy instances can send messages to free instances;
5) Proxy instances can receive messages from any Master or Free instance, but can only process those messages that don't change the model they represent; and,
6) Messages sent between master instances and their related proxy instances are transmitted across platform boundaries.

These rules are graphically represented by FIGS. 2 and 3, as will be discussed further below.

Embodiments of the present invention contemplate that rule number four can be implemented by the proxy sending messages to all affected instances. If the receiving instance is a free instance, the free instance (if possible) implements the received message. If the receiving instance is an unrelated master instance or another proxy instance, then the message is "dropped", meaning that no further processing is performed for that instance with the received message.

Rule number five can be implemented by a proxy receiving all messages directed to it. The proxy instance determines whether a received message is from its related master instance and, if so, implements the received action. If the received message is not from the proxy's related master instance, then the proxy checks to see if the received message attempts to change the state of the proxy instance. If not, then the proxy instance implements the received message. If it does, then proxy "ignores" the received message, meaning that the proxy does not implement the received message, but rather forwards on the received message to its related master instance. If desired, while ignoring a message, the proxy may give some indication, for example, that it is ignoring the message and, possibly, waiting for a response from its related master instance.

It should be noted that, as contemplated by embodiments of the present invention, the distinction between "dropping" a message and "ignoring" a message is that an instance "dropping" a message does not respond to the receipt of the message while an instance "ignoring" a message may respond to the message by changing its representation, but not its state, and passing on the received message to its related master instance. It should be understood that "ignoring" a message and "dropping" a message may be combined by forwarding an action to a receiving instance's related master instance directly instead of requiring the receiving proxy instance to forward the received message on its own. Alternatively, the messages broadcast may indicate which unrelated instances they affect as well as which related instances are affected. An implementation of this alternative embodiment includes expanding the "Address Info" section 122 to include all proxies affected.

It should be further noted that the above rules can be viewed from the receiving instance's perspective as well. When an action is generated and distributed by a first instance and that action can be implemented on a second instance, the second instance applies the rules stated above and recognizes that the action was generated by a type of instance which generates implementable actions. If the receiving instance does not recognize the generator of the message (for example, a proxy instance sending a message to an unrelated master instance or a proxy instance sending a message to an unrelated proxy instance), then the receiving instance treats the message as provided in the above rules.

Figure 2:
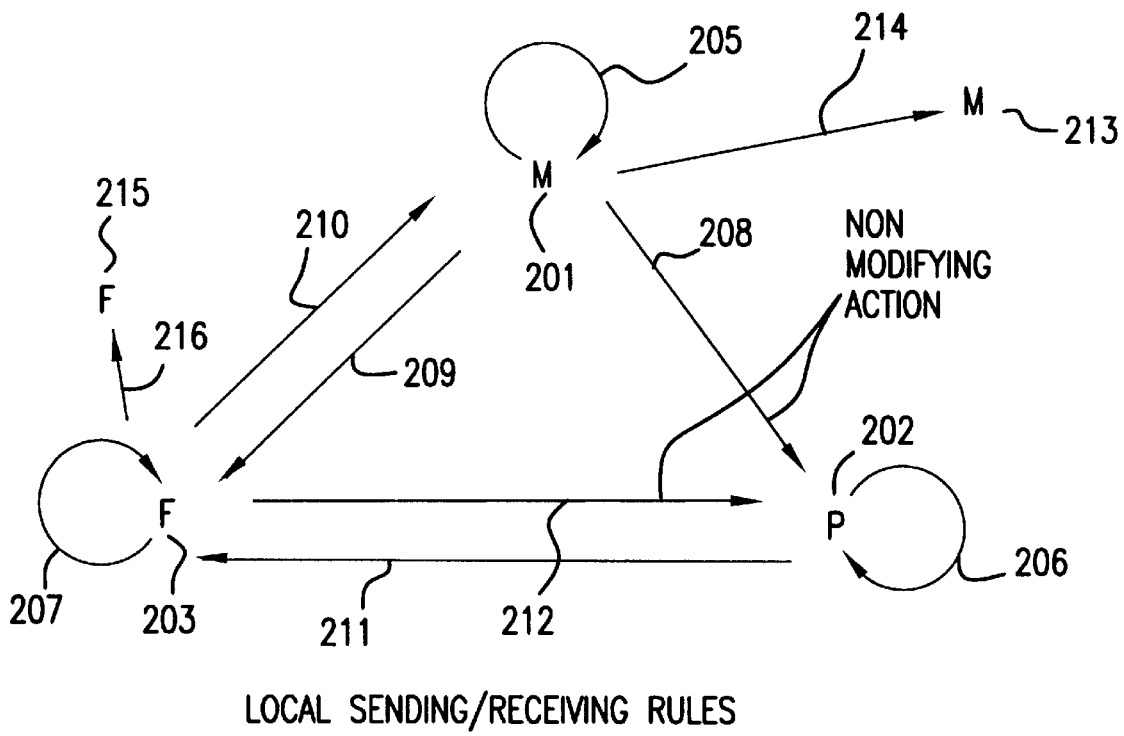
FIG. 2 shows the local sending and receiving rules of the different types of instances as contemplated by embodiments of the invention.

FIG. 2 represents the local sending rules between instances. Master instance 201, proxy instance 202, and free instance 203 can all send messages 205, 206, and 207 to themselves, respectively. Master instance 201 can send message 208 to proxy instance 202, message 209 to free instance 203, and message 214 to other master instance 213. Free instance 203 can send message 212 to proxy instance 202, message 210 to master instance 201, and message 216 to other free instance 215. Proxy instance 202 can send message 211 to free instance 203. Proxy instance 202 does not send messages to master instance 201. Additionally, message 206 from proxy instance 202 telling itself to do something requires the sending and receiving proxy instance to be the same (for example, telling itself to disappear). In other words, one proxy instance cannot send a message that will be implemented to another proxy instance.

Figure 3:
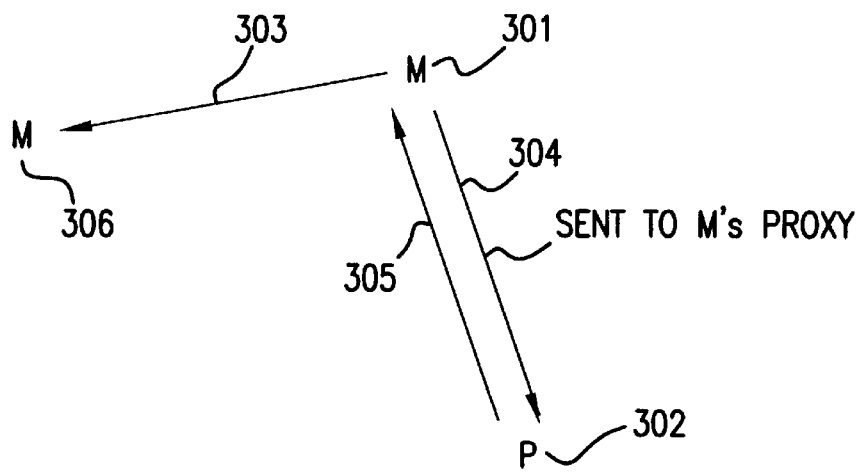
FIG. 3 shows the network sending and receiving rules of the different types of instances as contemplated by embodiments of the invention.

FIG. 3 shows network sending/receiving rules. Master instance 301 sends message 304 to its own proxy instance 302 and normal message 303 to other master instance 306.

Proxy instance 302 sends message 305 to its related master instance 301. An example of when message 305 is sent includes when proxy instance 302 receives a given action which it cannot implement (e.g., because the action attempts to change the state of the proxy). In response, the proxy instance 302 sends message 305 to its related master instance 301 containing the given action. This message 305 preferably includes a special header section 120 which indicates the message is from a proxy and directed to its master.

Figure 4:
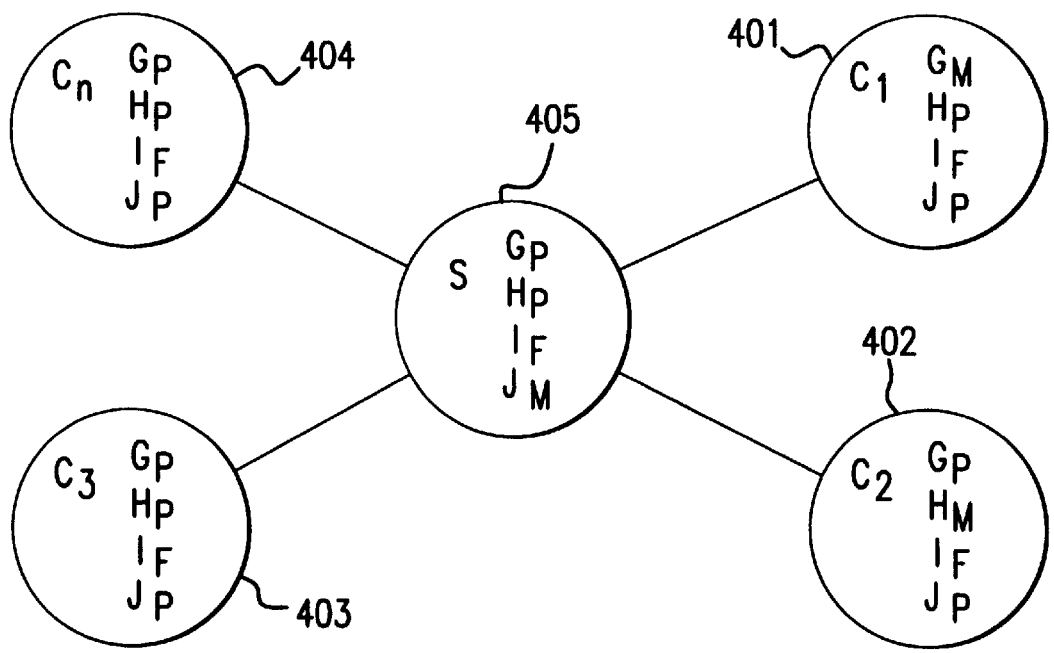
FIG. 4 shows a client/server configuration as contemplated by embodiments the invention.
Figure 5:
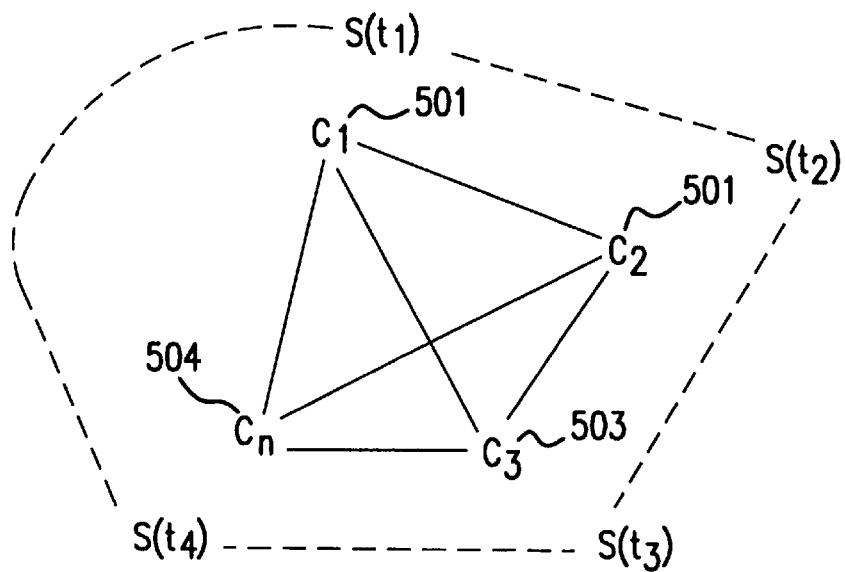
FIG. 5 shows a system of interconnected clients as contemplated by embodiments of the invention.

FIGS. 4 and 5 show possible networks over which the network sending rules of FIG. 3 are applied. FIG. 4 shows a client/server scheme with clients $C_1$ 401, $C_2$ 402, $C_3$ 403, and $C_n$ 404 all connected to server S 405. In this example, four objects exist in the world: G, H I and J. G, H, and J are all master/proxy instances while I is a free instance. Each platform as represented by clients $C_1$ 401, $C_2$ 402, $C_3$ 403, $C_n$ 404, and server S 405 have instances related to these objects. Here, client $C_1$ 401 is the master of G, client $C_2$ is the master of H, server S is the master of J. Table 1 indicates how each object is defined on each platform.

TABLE 1

| Platform | G | H | I | J |
|---|---|---|---|---|
| $C_1$ | Master | Proxy | Free | Proxy |
| $C_2$ | Proxy | Master | Free | Proxy |
| $C_3$ | Proxy | Proxy | Free | Proxy |
| $C_n$ | Proxy | Proxy | Free | Proxy |
| S | Proxy | Proxy | Free | Master |

As seen by this table and FIG. 4, any platform may support a master instance, and some platforms may not contain any master instances at all. In addition, each platform decides the order in which inputted actions are received. For example, if $H_M$ (the master instance of H) on client $C_2$ sent an action affecting G at the same time $J_M$ on server S sent an action affecting G, client $C_1$ would decide which action was received first, and accordingly decide which action should be implemented first, irrespective of the actual sending times of the actions from $H_M$ and $J_M$.

FIG. 5 shows an example as contemplated by embodiments of the present invention depicting a client network without a central server. FIG. 5 shows clients $C_1$ 501, $C_2$ 502, $C_3$ 503, and $C_n$ 504, all interconnected. In this FIG. 5, the master for object G (represented by $G_M$) can switch platforms over time. At time t, the master for object G is at client $C_1$. At time $t_2$, it is with client $C_2$. At time $t_3$, it is with client $C_3$. Finally, at time $t_n$, it is with client $C_n$. It should be noted that the master instances may switch platforms in FIG. 4 as well. Also, any of these clients may be configured so as to only monitor the world by never introducing any changes.

The following examples illustrate at least some of the information exchange between platforms. The examples include implementing a local change among instances, claiming a limited resource, implementing a global change, and sharing control over objects. It should be noted that the terms "message" and "action" are used herein to represented commands directed to different instances. In some cases, for simplicity, an action and a message may share the same reference numeral. When placed in an action queue, the referenced element refers to the action sent from a first instance to a second instance. When represented by an arrow between instances, the reference numeral refers to the action as figuratively traveling between the first instance and the second instance.

As shown in the following examples, an action queue receives information and outputs the received information in the order it was received. This action queue may also be referred to as an input queue.

Example 1

Figure 6:
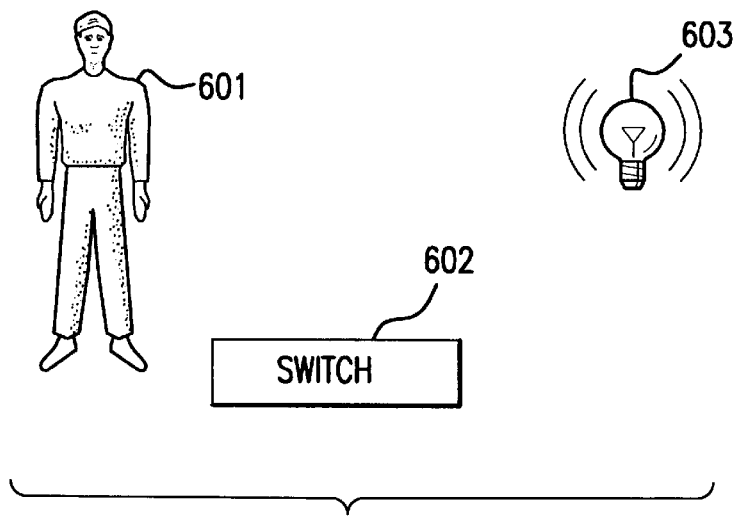
FIG. 6 shows a first example of the invention.

Example 1 illustrates how a local change is implemented, as contemplated by embodiments of the present invention. For this example, FIG. 6 shows the objects involved. The objects include character 601, switch 602 and light 603. The action involved is character 601 stepping on switch 602, which then commands light 603 to turn on.

Figure 7:
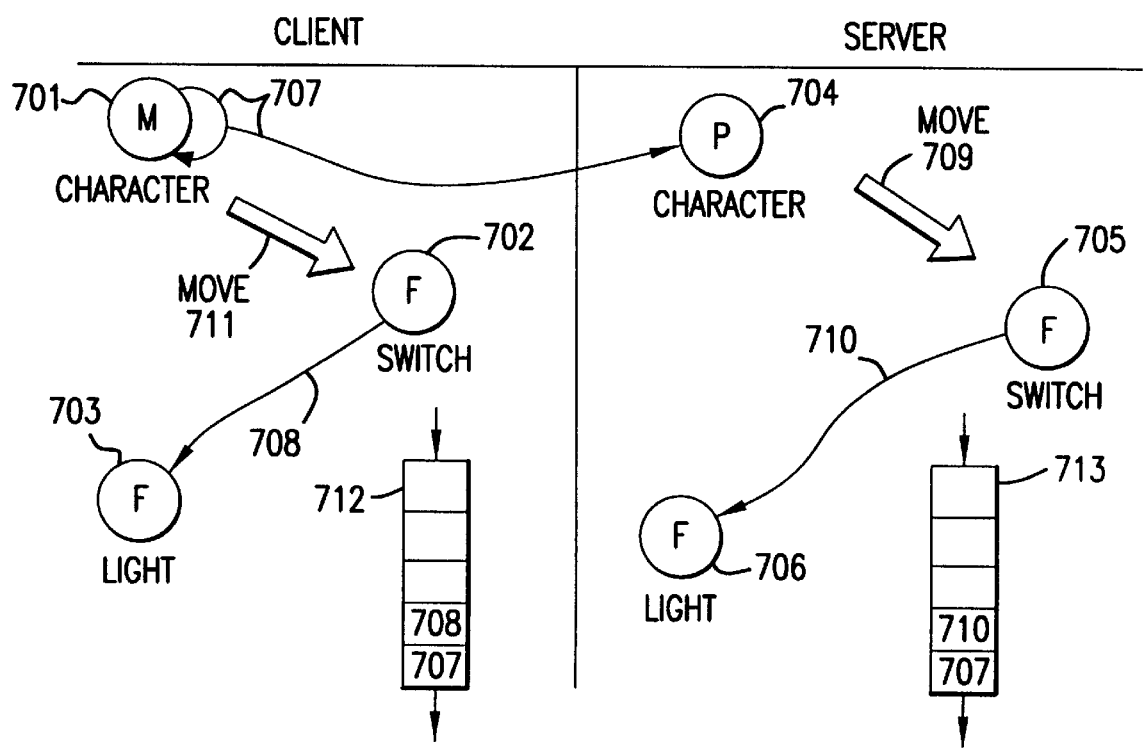
FIG. 7 shows the interchange and processing of information of the first example.

FIG. 7 shows a client and a server implementing the above action. Here, the client is the master of the character object 601 as represented by character master instance 701. As the character master instance 701 controls the state of the object it represents as well as its related proxy instances, it is referred to as "controlling" information. On the server, the character object 601 is represented by character proxy instance 704. As the character proxy instance 704 is controlled by related character master instance 701, character proxy instance 704 is referred to as "controlled" information. Both the switch object 602 and the light object 603 are free instances. These free instances are represented by switch free instance 702 and light free instance 703 on the client and by switch free instance 705 and light free instance 706 on the server. As these free instances 702, 703, 705, and 706, may temporarily assume states independent of each other, free instances are referred to as "independent" information.

The different platforms may be remote from one another. Accordingly, one may refer to locally stored information as information stored on a first platform and remotely stored information as information stored on another platform.

In response to a user's action, character master instance 701 is controlled to move through message 707. Following the above sending rules regarding master instances, message 707 is also transmitted to character proxy instance 704 associated with character master instance 701. On every platform, the action 707 is placed into an action queue 712, 713. The system on each platform implements the actions in the action queue 712, 713 in a First-In-First-Out order. Here, master character instance implements the "move" action contained in message 707. The action of character master instance 701 is the movement as represented by arrow 711.

Next, switch free instance 702 detects a collision between character master instance 701 and itself. In response, switch free instance 702 runs an associated script. Here, the script places new action 708 into the action queue 712 on the client platform. The action 708 is represented by message 708 being sent to light free instance 703. The action 708 commands light free instance 703 to turn on through message 708. In response to message 708, light free instance 703 turns on.

On the server side, character proxy instance 704 receives message 707 containing the command to move. The message 707 is placed into and executed from action queue 713. In response, character proxy instance 704 commands itself to move as represented by arrow 709. Switch free instance 705 detects the collision between character proxy instance 704 and itself. In response, switch free instance 705 runs an associated script and adds action 710 (which commands light 706 to turn on) to action queue 713. In response to the implementation of action 710, light free instance 706 turns on.

It is apparent that in the example as shown in FIGS. 6 and 7 that the only action exchanged between the client and the server is action conveyed by message 707. The remaining actions of the character proxy instance 704 and switch free instance 705 and light free instance 706 are determined locally on the server.

Example 2

Figure 8:
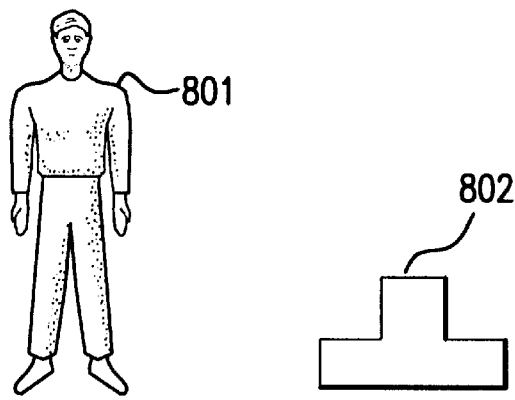
FIG. 8 shows a second example of the invention.

Example 2 relates to an object claiming a limited resource. As disclosed in FIG. 8, character object 801 attempts to pick up hat object 802. The resulting action of the character object 801 picking up hat object 802 is the hat disappearing from view and the hat being added to character object 801's inventory of picked up objects.

Figure 9A:
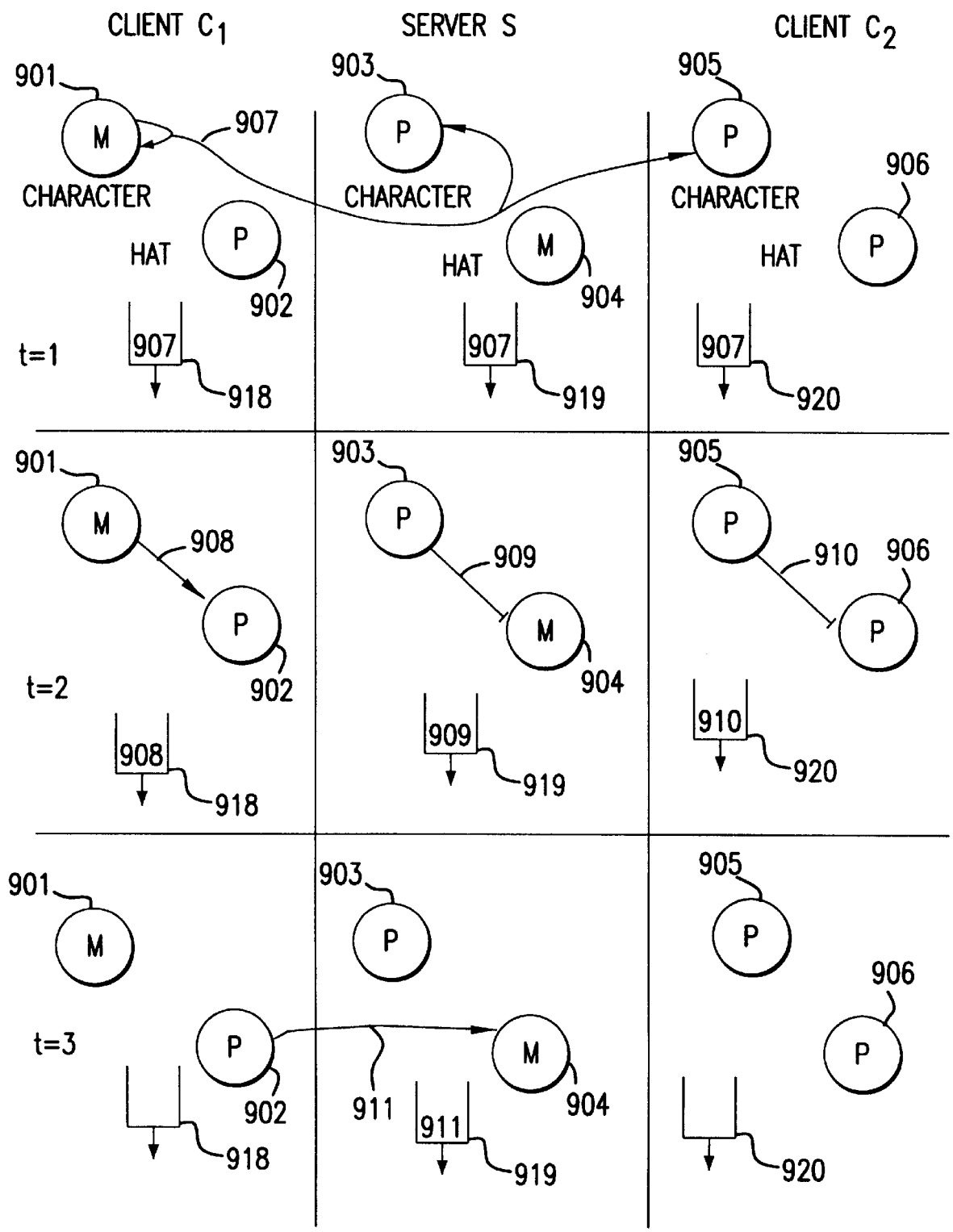
FIGS. 9A, 9B, and 9C shows the interchange and processing of information of the second example.
Figure 9B:
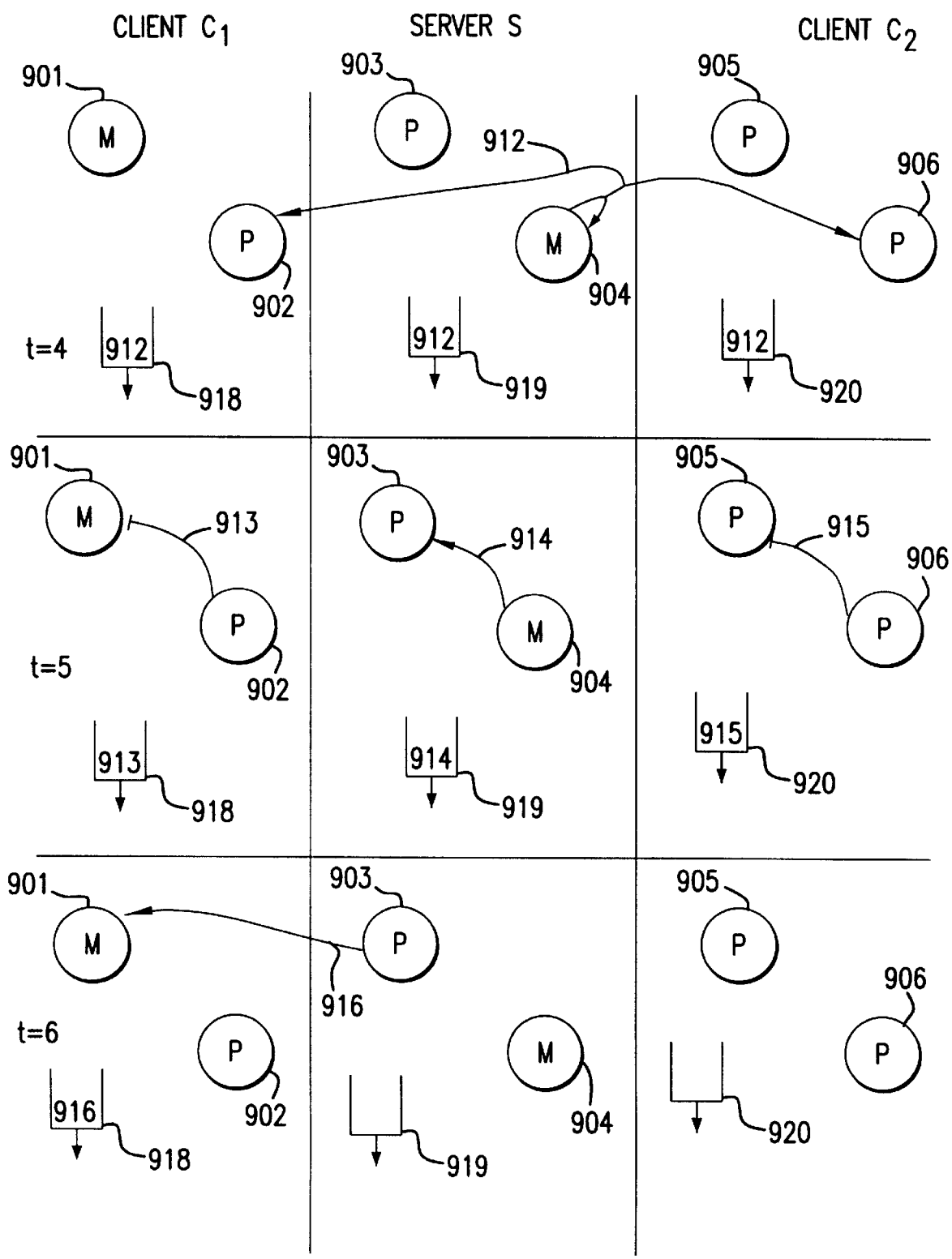
Figure 9C:
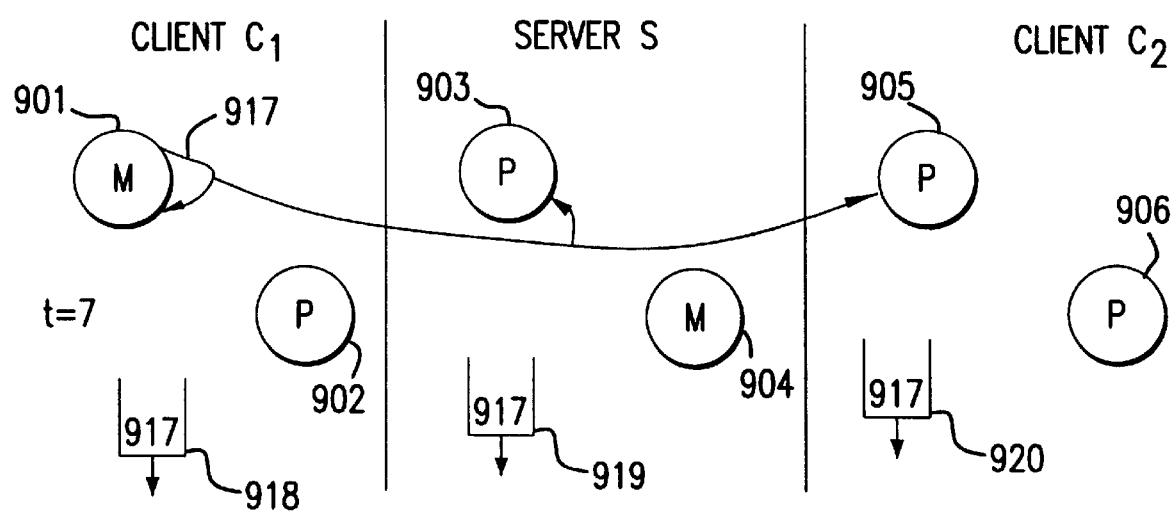

As disclosed in FIGS. 9A, 9B, and 9C, the master instance of character 801 is represented as character master instance 901 on client $C_1$. Associated proxy instances 903 and 905 are distributed on server S and client $C_2$, respectively. Hat 802 is a master/proxy type of object and is represented by hat proxy instances 902 and 906 on clients $C_1$ and $C_2$, respectively. Hat master instance 904 is located on server S. FIG. 9 is broken into seven time periods $t_1$–$t_7$.

The exchange of information is as follows. Character master instance 901 receives an action to pick up hat proxy instance 902. In response, character master instance 901 attempts to pick up hat proxy instance 902. This attempt is action 907 transmitted to itself and its related proxies at time $t_1$. In each platform, the message containing action 907 is placed into action queues 918, 919, and 920 respectively. Next, character master instance 901 sends the pickup request action 908 to hat proxy instance 902 at time $t_2$. This action 908 is placed into and executed from action queue 918.

Hat proxy instance 902 receives message 908 and determines that it would have to modify its own state. Here, proxy instance 902 determines that it would have to disappear. As a proxy cannot modify its own state the proxy follows the rules set forth above and "ignores" message 908. The proxy assumes a "waiting" mode showing that it is currently waiting for a command from its master instance 904. Here, hat proxy instance 902 may, for example, invert in color, change color, take on a contrasting aura, cause a sound to be emitted on a user's system, or take on or emit equivalent signals or temporary states so as to indicate the that hat proxy instance 902 is in a waiting mode. Also, hat proxy instance 902 sends at time $t_3$ a specific message 911 to hat master 904 containing the action in message 908. As the proxy instance 902 may not know the exact location of the hat master instance 904, it broadcasts message 911 with an appropriate header information so that it will be processed only by the appropriate master instance, in this case, by hat master instance 904. It should be noted that, through using header information, any given master does not need to know where its related proxies are. Likewise, proxies do not need to know precisely where their related masters are as well. Rather, some messages may contain designation information which designates which instances may receive the specific message.

Referring back to FIG. 9A, another instance which receives the message 907 is character proxy instance 903 located on server S. Character proxy instance 903 determines that the message 907 is from its master instance (character master instance 901). In response, it performs the action as dictated through message 907 and sends out ("pick-up request" action 909) to hat master instance 904 at time $t_2$. This action 909 is placed into and executed from action queue 919.

Hat master instance 904 receives a message containing action 909 from character proxy instance 903. As this message is from an unrelated proxy instance, hat master instance 904 drops message 909. The dropping of this message is indicated by a bar terminating connecting message line 909.

Next, hat master instance also receives message 911 from hat proxy instance 902. In response, hat master instance 904 determines that it is being picked up and determines whether this action is permissible. In other words, it checks for conflicts. For example, hat master instance 904 determines whether it has been picked up by another character. In response, and if permissible, hat master instance 904 commences two actions: 1) it tells itself through message 912 at time $t_4$ to disappear and 2) tells through message 914 at time $t_5$ the character proxy instance 903 that the hat instance 904 has just been picked up by the character instance 903. These actions 912 and 914 are placed into and executed from action queue 919. Message 912 from hat master instance 904 is also broadcast to the various other hat instances 902 and 906 and placed into the action queues 918 and 920 on their respective platforms.

Hat proxy instance 902 receives message 912 from hat master instance 904, determines that the message 912 is a command from hat master instance 904, and performs the action contained in message 912 at time $t_5$. In this case, hat proxy instance 902 implements the action of turning itself off and transmits message 913 to character master 901 at time $t_5$. In due course, the action 913 is placed into and executed from action queue 916.

Character proxy instance 903 receives message 914 from hat master instance 910. As character instance 903 is a proxy, it determines whether or not it has to change state in response to message 912. Two possibilities exist in responding to message 914: 1) character proxy instance 903 may have to change state or, 2) character proxy instance 903 may not have to change state.

If character proxy instance 903 determines that it does not have to change state, then it implements the picked-up message 914 accordingly (e.g., adding hat instance 904 to a list of claimed items). If it does have to change state to implement message 914, then character proxy instance 903 ignores message 914 and forwards message 914 as message 916 to its related master 901. Depending on how configured, character proxy instance 903 may also assume a waiting state, indicating that it is waiting for a message from its associated master 901.

When character master instance 901 receives message 913, character master instance 901 determines the message 913 is from a proxy instance and drops the message. When character master instance 901 receives message 916, it determines that the received message 916 is from its related proxy instance 903, checks for conflicts, then implements the message. Character master 901 then transmits its message 917 indicating it has now picked up the hat instance 902 and added the hat to its inventory.

Character proxy instance 903 receives message 917, determines that the message is from its related master and implements the action contained in message 917 accordingly.

The occurrence of events on client $C_2$ is similar to those described above. Character proxy instance 905 receives message 907 indicating that the character proxy instance 905 should pick up the hat proxy instance 906. The action contained in message 907 is placed and executed from action queue 920. Character proxy instance 905 attempts to pick up hat proxy instance 906 by transmitting message 910 to hat proxy instance 906. The action contained in message 910 is placed in and executed from action queue 920. The hat proxy instance 906 determines that the message 910 is from a proxy instance and drops it. Later, hat proxy instance 906 receive message 912 (as having been placed in action queue 920), determines that the message 912 is from its related master, and implements it, telling itself to disappear and to alert the character proxy instance 905 that it has just picked up the hat through message 915. Action 915 is placed into and executed from action queue 920. Character proxy instance 905 determines that message 915 is from a proxy instance and ignores it. Finally, character proxy instance 905 receives message 917 from its related master 901 and implements the action contained in message 917.

Example 3

Figure 10:
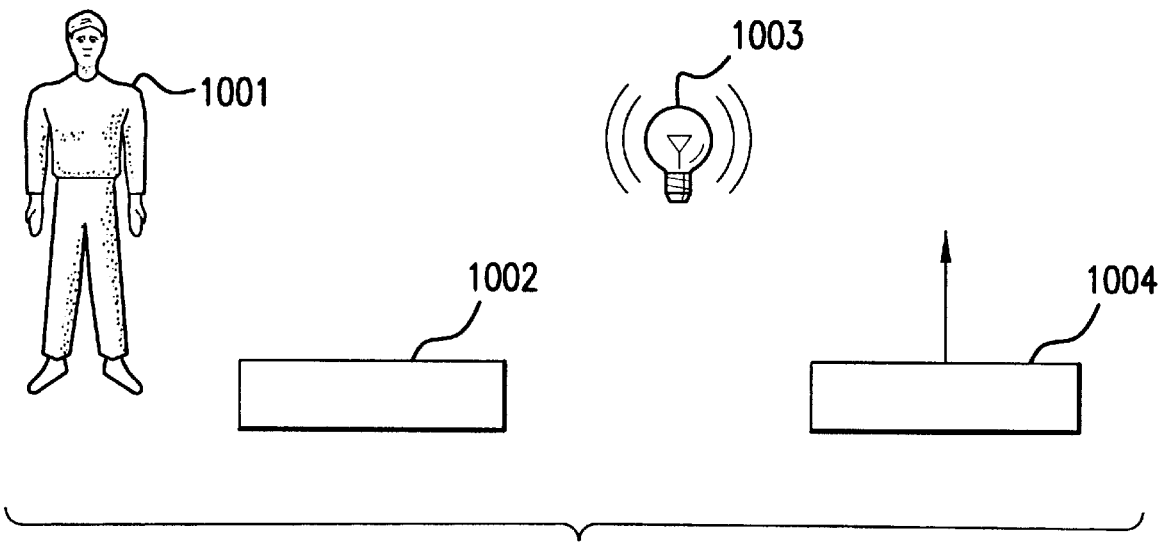
FIG. 10 shows a third example of the invention.

Example 3 relates to an object implementing a global change. As shown in FIG. 10, character object 1001 steps on switch object 1002 causing light 1003 to turn on and elevator 1004 to move. The turning on of the light object 1003 has been described before with reference to Example 1. Example 3 shows how both the local change and the global change are implemented.

Figure 11A:
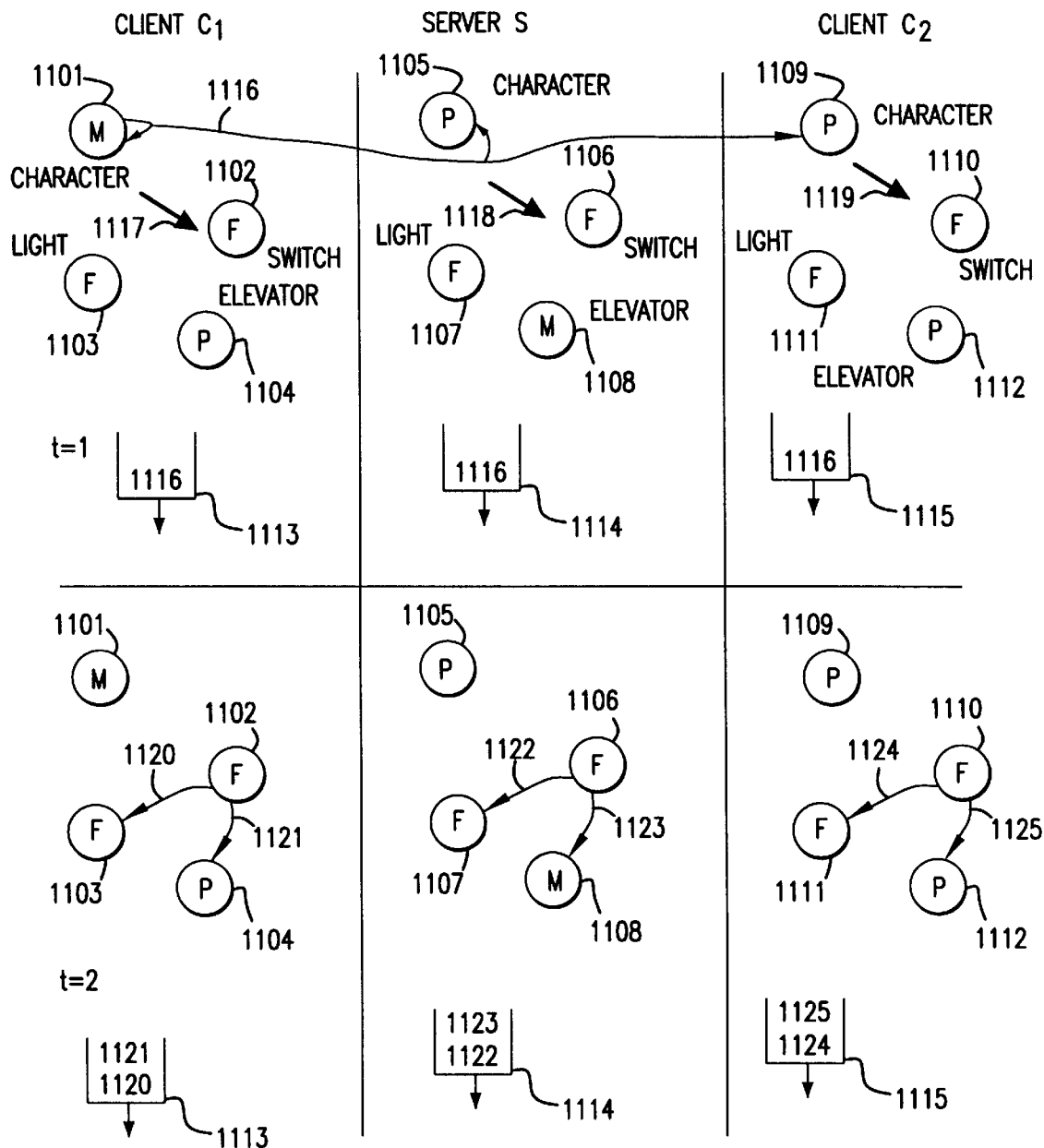
FIGS. 11A and 11B show the interchange and processing of information of the third example.
Figure 11B:
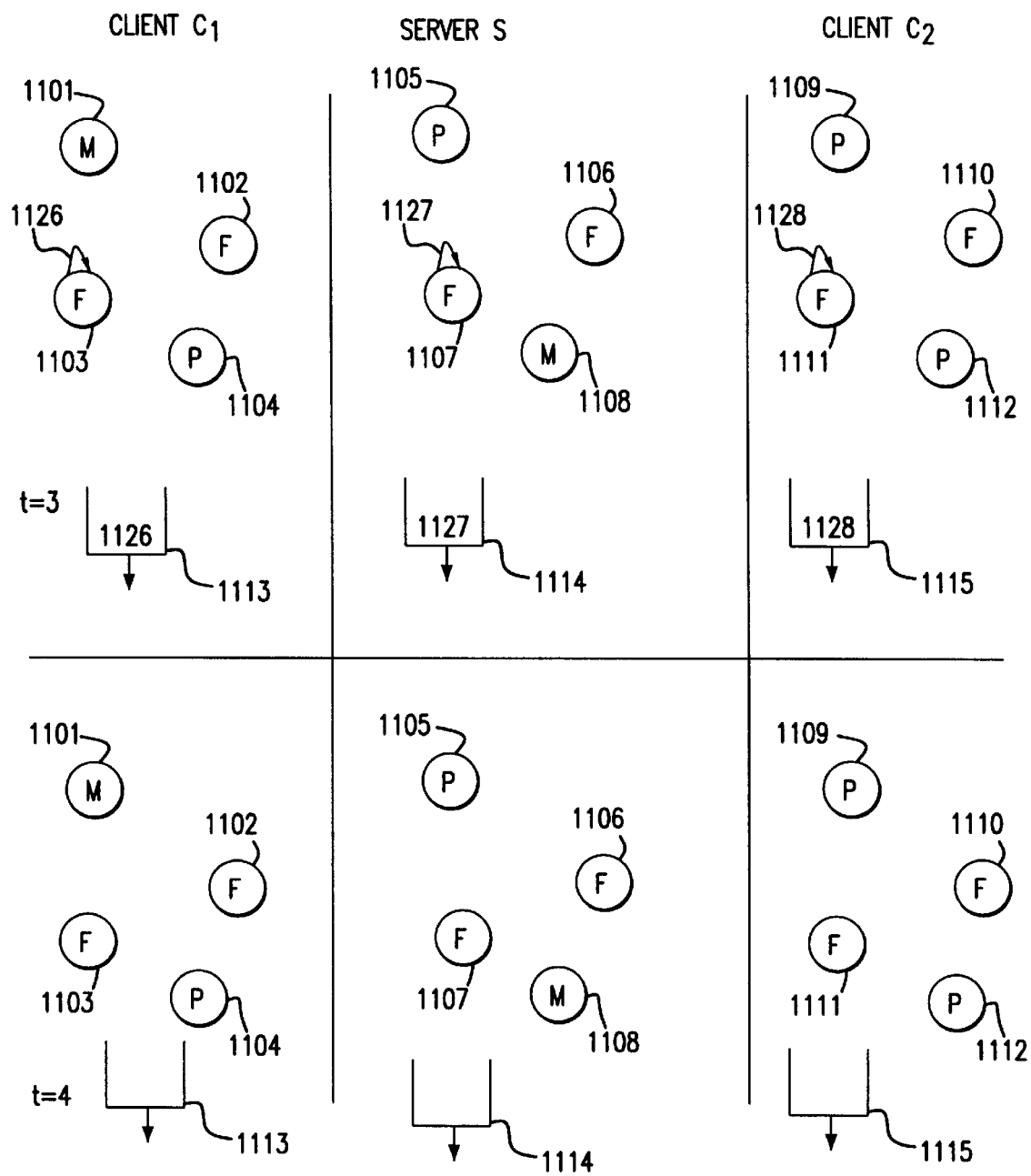

FIG. 11 shows how the signals from different platforms are exchanged when implementing a global change. The three platforms described include client $C_1$, server S, and client $C_2$. Character master instance 1101 is resident on client $C_1$ and elevator master instance 1108 is resident on server S. The related proxy representations of character master instance 1101 are located on server S and client $C_2$ as character proxy instances 1105 and 1109, respectively. The related proxy representations of elevator master instance 1108 are located on clients $C_1$ and $C_2$ as elevator proxy instances 1104 and 1112, respectively. The switchandlightinstances 1102, 1103, 1106, 1107, 1110, and 1111 are free instances across the various platforms $C_1$, $C_2$ and S. Time is broken into four segments $t_1$, $t_2$, $t_3$, and $t_4$.

Character master instance 1101 receives a command to move onto switch instance 1102. In response, character master 1101 commands itself to move through message 1116 at time $t_1$. As message 1116 is a message from a master instance, it is transmitted to the other platforms S and $C_2$. Each platform that receives message 1116 places it in each platform's action queue (1113, 1114, 1115).

On platform $C_1$, in response to message 1116, character master instance 1101 moves as represented by movement arrow 1117 at time $t_1$. The switch free instance 1102 detects that the master character instance 1101 has stepped on it and responds by placing actions 1120 and 1121 in action queue 1117 at time $t_2$. These actions are checked for conflicts then implemented. In response to action 1120, light free instance 1103 turns on at time $t_3$.

Elevator proxy instance 1104 receives message 1121 and determines whether it needs to change state to comply with message 1121. As message 1121 is a command for elevator proxy instance 1104 to move, and that moving would change the state of the elevator proxy instance 1104, the elevator proxy instance 1104 ignores message 1121. Instead, it may show to the user that it has received a message, for example by changing color, minor animation or movement, changing size, causing a sound to be emitted by a controlled speaker or through other equivalent means. It should be noted that if message 1121 did not change the state of elevator proxy instance 1104, then the instance 1104 would have implemented the message. Alternatively, action 1121 may be ignored without more if the proxy instances are not enabled to respond to state-changing actions. Finally, elevator proxy instance 1104 forwards message 1121 to elevator master instance 1108 at time $t_3$ as message 1129.

Viewing the world from the server S, character proxy instance 1105 receives message 1116, determines the message 1116 is from its related master instance 1101, and implements the action contained in message 1116. Here, character proxy instance 1105 moves as shown by movement arrow 1118 at time $t_1$. Switch free instance 1106 detects a collision with character proxy instance 1105 and executes at time $t_2$ the predetermined scripts of turning on a light and commanding an elevator to move. This script includes switch free instance 1106 sending message 1122 to light free instance 1107 and sending message 1123 to elevator master instance 1108. These actions are placed in the action queue buffer 1114 and later implemented. Here, light free instance 1107 turns on at time $t_3$ as instructed to through message 1127. Also, elevator master instance checks for conflicts and implements message 1123 at time $t_3$. Elevator master instance 1108 may or may not have received messages 1129 and 1130 from elevator proxy instances 1104 and 1112, respectively due to delay in communications between platforms. If elevator master instance 1108 received either one of messages 1129 or 1130, or both, before it received message 1123, then elevator master instance 1108 could have implemented either message first. In an alternate embodiment, as it is a master instance and is being affected, elevator master instance 1108 could have waited until it received either one of message 1129 and/or 1130 before implementing the actions contained within the messages. Finally, elevator master instance 1108 checks for conflicts (e.g., if it has already been requested to move), and, if possible, implements the action contained in its received message (1123, 1129 and/or 1130) and transmits its update to its proxies through message 1131 at time $t_4$.

Similarly, on client $C_2$, character proxy instance 1109 receives message 1116, determines the message 1116 is from its related master instance 1101, and implements the action contained in message 1116. Here, character proxy instance 1109 moves as indicated by arrow 1119. Switch free instance 1110 detects a collision with character proxy instance 1109 and executes the predetermined script of turning on a light and commanding an elevator to move at time $t_2$. Next, switch free instance 1110 sends message 1124 to light free instance 1111 and sends message 1125 to elevator proxy instance 1112 at time $t_3$. These actions are placed in and executed from action queue 1115.

Elevator proxy instance 1112 receives message 1125 and determines whether it needs to change state to comply with message 1125. As message 1125 is a command for elevator proxy instance 1112 to move, and that moving would change the state of the elevator proxy instance 1112, the elevator proxy instance 1112 ignores the move command as transmitted through message 1125 and transmits it through message 1130 to elevator master instance 1108 at time $t_3$. It may also show to the user that it has received a message and is temporarily waiting for authorization to change its state as described above. As above, it should be noted that if message 1125 did not change the state of elevator proxy instance 1112, then the instance 1112 would have implemented the message. Alternatively, the elevator proxy instance 1112 may ignore all messages not from its master and not give any indication of it waiting to change state (depending on its programming).

Finally, on both clients $C_1$ and $C_2$ the related elevator proxies 1104 and 1112 implement the move action as contained in message 1131.

It should be noted that each action preferably affects exactly one instance. For example, when the switch 1102 detected a collision with character master 1101, it generated two actions (1120 and 1121). Accordingly, each resulting action only needs to be processed once by the system running on each platform.

In an alternated embodiment, which applies to the other examples as well, each message which is broadcast may additionally include information relating to the instances they affect. Referring to FIG. 11A, as envisioned by this alternative embodiment, message 1116 may designate all instances affected by its action. This entails that all switches 1102, 1106, and 1110 may begin to respond to a received action of character master 1101. One advantage of this alternative embodiment is that it removes the delay associated with each of proxy instances 1105 and 1109 having to implement message 1116. Rather, switches 1106 and 1110 may respond directly to message 1116. In other words, the instances representing switch object 1002 would have received message 1116 and known to start implementing it.

In another embodiment, Rule 4 may be altered to allow all instances to receive and implement messages from proxies. While not shown for simplicity, an example of this change is with reference to the present messages of FIG. 9A. Instead of message 909 being dropped by hat master instance 904, hat master instance 904 implements action 909. This way hat master instance 909 does not have to wait until related hat proxy instance 902 sends message 911 to hat master instance 904.

Example 4

Figure 12:
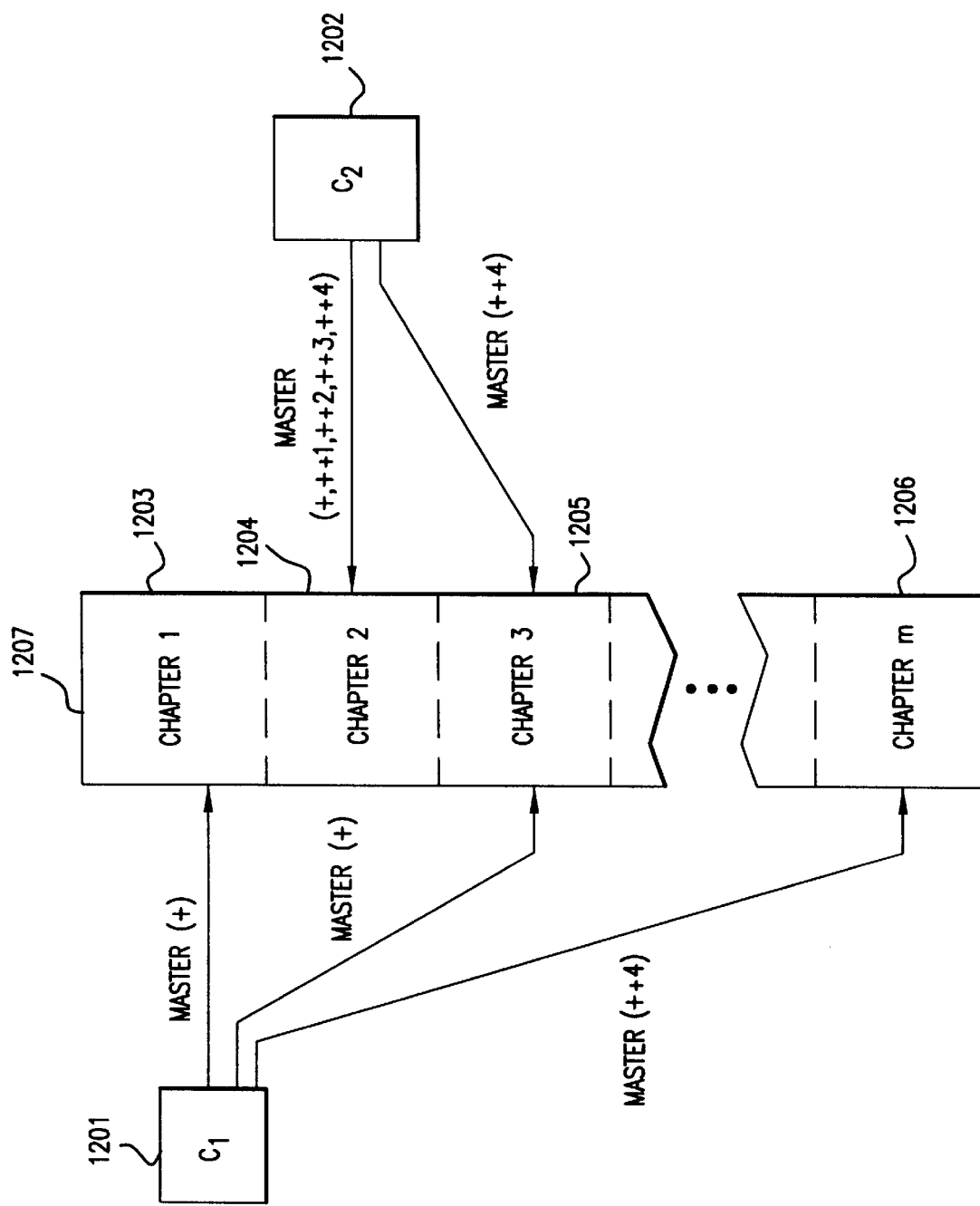
FIG. 12 shows a fourth example of the invention.

Example 4 as shown in FIG. 12 relates to editing a document. Here, the document is divided into chapters 1 through M. In this example, the master instance of the different chapters switches locations. Initially, the document master 1207 is stored on server S. Here, while server S allows other platforms to become the master of some instances, the embodiments of the present invention contemplate the server S retaining the conflict resolution responsibility of a master instance. Clients $C_1$ 1201 and $C_2$ 1202 seek to edit certain portions of document. Accordingly, they are granted rights to be the master of certain requested chapters of the document at certain times with server S coordinating the control of the chapters.

By having the server S settle disputes arising between clients, confusion between who is the master of a given portion of a document is minimized. If the server S did not settle conflicts but the current master of a portion of a document did (for example, $C_1$), then it is possible that some clients may believe that they each are masters of a document. For example, if $C_1$ and $C_2$ simultaneously claim Chapter 3, then, without the conflict resolution ability of the server S, both may rightfully believe that they are each the master of Chapter 3.

FIGS. 12 and 13 show how master control of different chapters would be requested and obtained. Here, client $C_1$ attempts to relinquish control of chapters 1 and 3 and gain control of chapter M. Client $C_2$ attempts to gain control of chapter 3. It should be noted that the different time periods and the transactions occurring during them are merely by way of example. One may combine the transactions of two or more time periods in accordance with overlying parameters and the timing of system-wide broadcasts.

In this example, the platforms containing the proxy instances of different chapters may attempt to modify the master instances per the above rules. Alternatively, a system may be implemented where an instance can only be modified from its own platform. In other words, the master instance of an object does not receive requests for modification from other instances.

As shown in FIG. 13, at time t, client $C_1$ is the master of chapters 1 (1203) and 3 (1205), client $C_2$ is the master of chapter 2 (1204) and server S is the master of all remaining chapters.

At time t+1, client $C_1$ broadcasts its release of chapters 1 and 3. Also, it broadcasts its claim of chapter M from server S. Client $C_2$ receives the release of client $C_1$'s claim as the master of chapters 1 and 3. The chapter 1 instance as located on the server platform receives the release of chapter 1 from client $C_1$ and becomes the master instance of chapter 1. The server's chapter 2 instance is still a proxy instance. The server's chapter 3 instance receives the release of chapter 3 from client $C_1$ and becomes the master instance of chapter 3. The server's chapter M instance receives the request from client $C_1$.

At time t+2, the server's chapter 1 instance broadcasts a message that it is now the master instance of chapter 1. Likewise, the server's chapter 3 instance broadcasts a message that it is the master instance of chapter 3. The server's chapter M instance broadcasts a message that client C, is the master instance of chapter 1. Client $C_1$ receives the message that it is the master of chapter M and, accordingly, becomes the master instance of chapter M.

At time t+3, client $C_2$ broadcasts a claim of chapter 3. The server's chapter 3 instance receives a claim from client $C_2$.

At time t+4, the server's chapter 3 instance broadcasts a message that master instance of chapter 3 is now with client $C_2$. Client $C_2$ receives the message that it is the master instance of chapter 3 and becomes the master instance of chapter 3.

Example 5

Figure 14A:
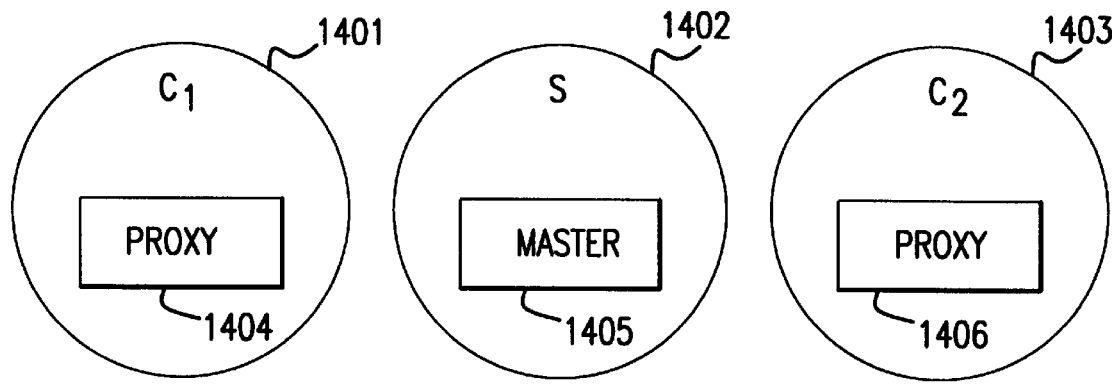
FIGS. 14A and 14B show a fifth example of the invention.
Figure 14B:
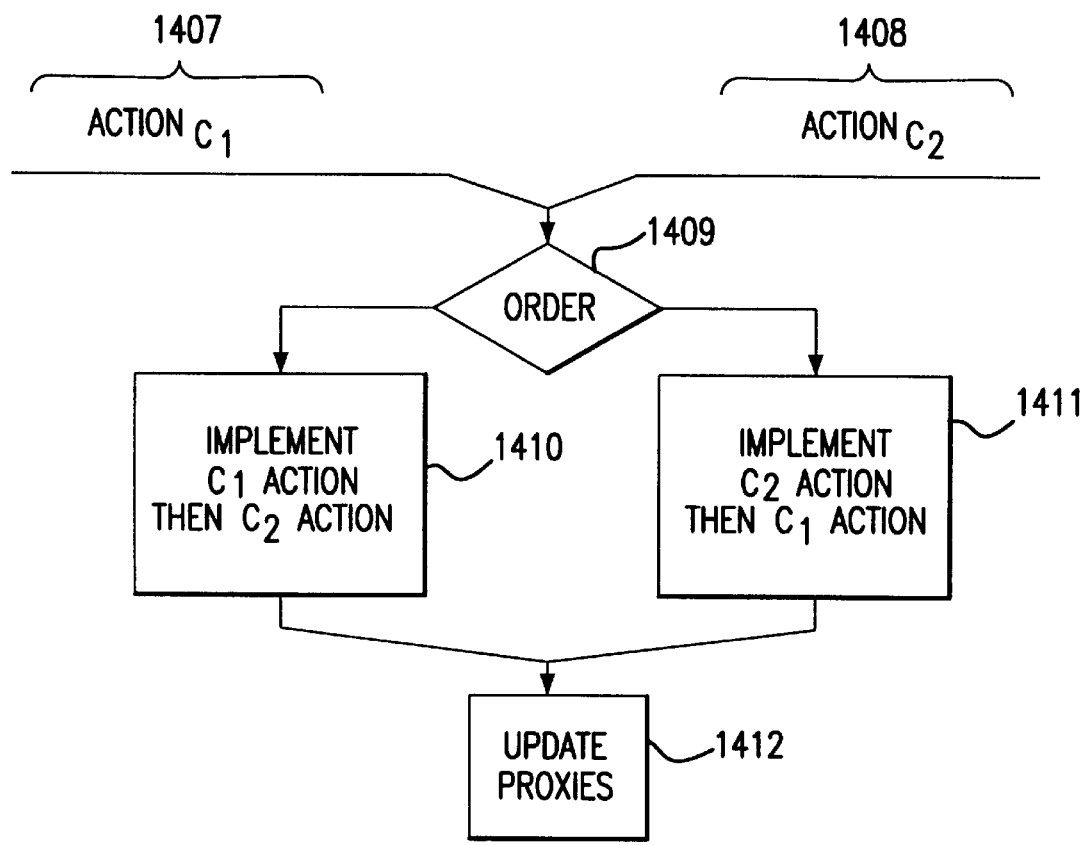

FIGS. 14A and 14B show an implementation of information processing performed on an object as represented by multiple instances. As shown in FIG. 14A, the world contains three platforms: client $C_1$ 1401, client $C_2$ 1402, and server S 1403. Client $C_1$ and client $C_2$ both have proxy instances 1404, 1406 of the object to be modified, respectively. Server S has the master instance 1405 of the object. It is the platform which contains the master instance relating to an object which determines which action was received first. Here, server S determines in which order the received actions are to be implemented.

FIG. 14B shows how the server S containing the master instance of the object receives requests for changes 1407 and 1408 from clients $C_1$ and $C_2$, respectively. Master instance 1405 determines in step 1409 which action arrived at the server S first. If the action from client $C_1$ was received first, step 1410 is executed; otherwise, step 1411 is executed. Step 1410 implements action 1407 then implements action 1408 on the master instance 1405. Step 1411 implements action 1408 then implements action 1407 on the master instance 1405. Following both steps 1410 and 1411 is step 1412 which updates the proxy instances 1404, 1406 to the change implemented on the master instance 1405.

Figure 15:
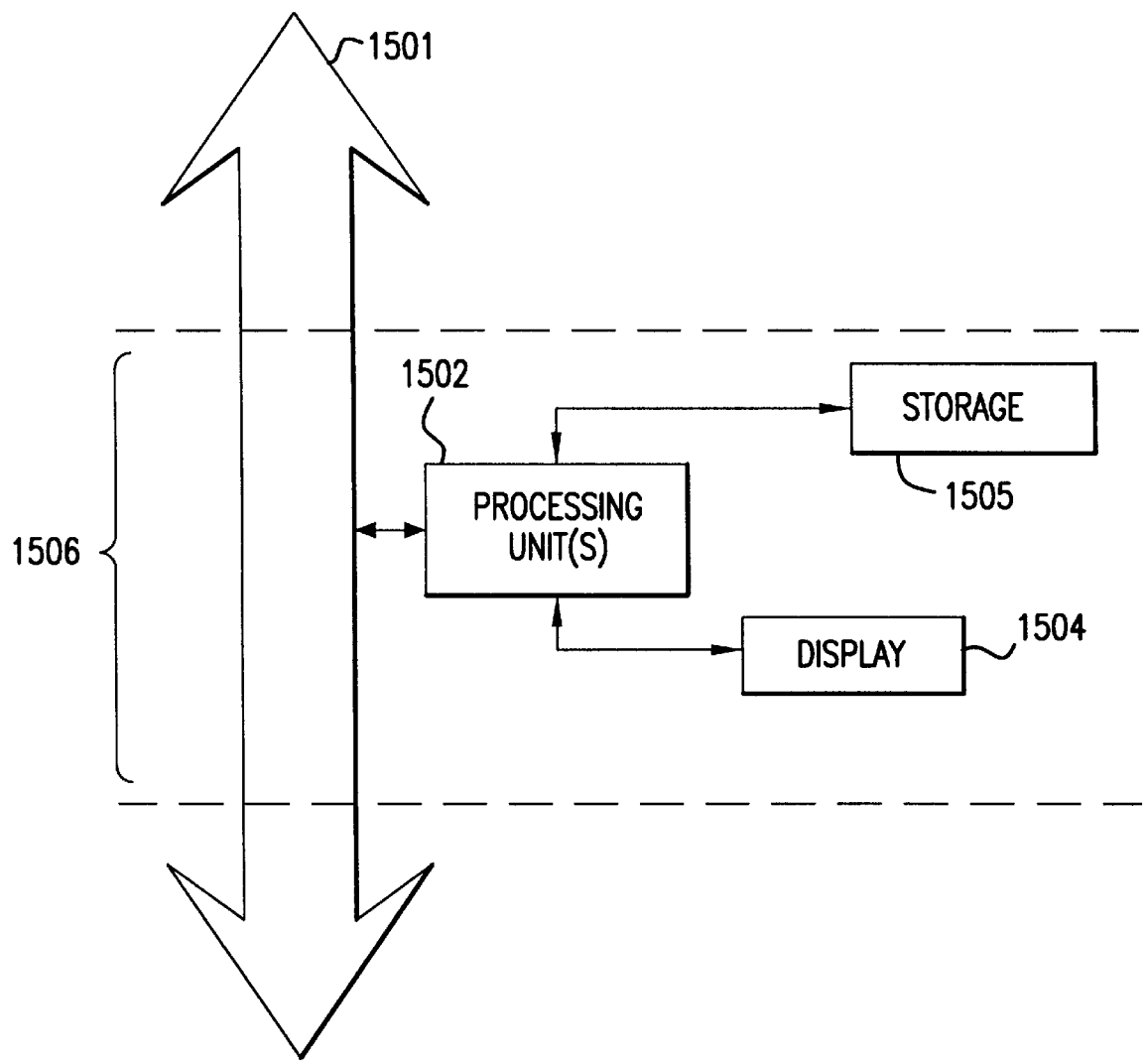
FIG. 15 shows a hardware implementation as contemplated by embodiments of the invention.

Hardware/software embodiments of the present invention, as well as environments utilized therewith, are now shown with regard to FIG. 15. Referring to FIG. 15, a computer platform 1506 is shown, which can represent client and/or server platforms. An example of such platforms include Hewlett Packard Dual Pentium Vectra servers (from Hewlett Packard Company of Palo Alto, Calif.) and Pentium-based clients (for example, a personal computer from I.B.M. (of Armonk, N.Y.) with an Intel (of Santa Clara, Calif.) Pentium 133 MHZ processor, running Microsoft's Windows 3.1 or 95, with 16 MB RAM and 1.6 GB hard drive).

Network 1501 connects platform 1506 to other platforms. The embodiments of the present invention contemplate network 1501 be the Internet. Also, the embodiments of the present invention contemplate network 1501 being a local area network. The protocol running on network 1501 includes at least on of TCP/IP, IP, IPX, Appletalk, and other equivalents thereof. Connected to network 1501 (and part of platform 1506) is at least one processing unit 1502 which receives and transmits actions across the network 1501. Preferably the processing unit 1502 can be an Intel 486 DX/2, Pentium, Pentium Pro, or equivalent processor. Storage 1505, connected to processing unit 1502, may hold the executable program implementing the invention, data for all instances stored locally on this platform 1506, or information to be transmitted to the display 1504. Storage 1505 may be one or combination of the following storage devices including RAMs, ROMs, EEPROMs, EPROMs, VRAMS, optical memories, CD-ROMs, magnetic memories including removable disks, magneto-optical memories and equivalents thereof Display 1504 may be a CRT, LCD, or any equivalent thereof display-type system using, for example, the VGA or SVGA standard.

Figure 16A:
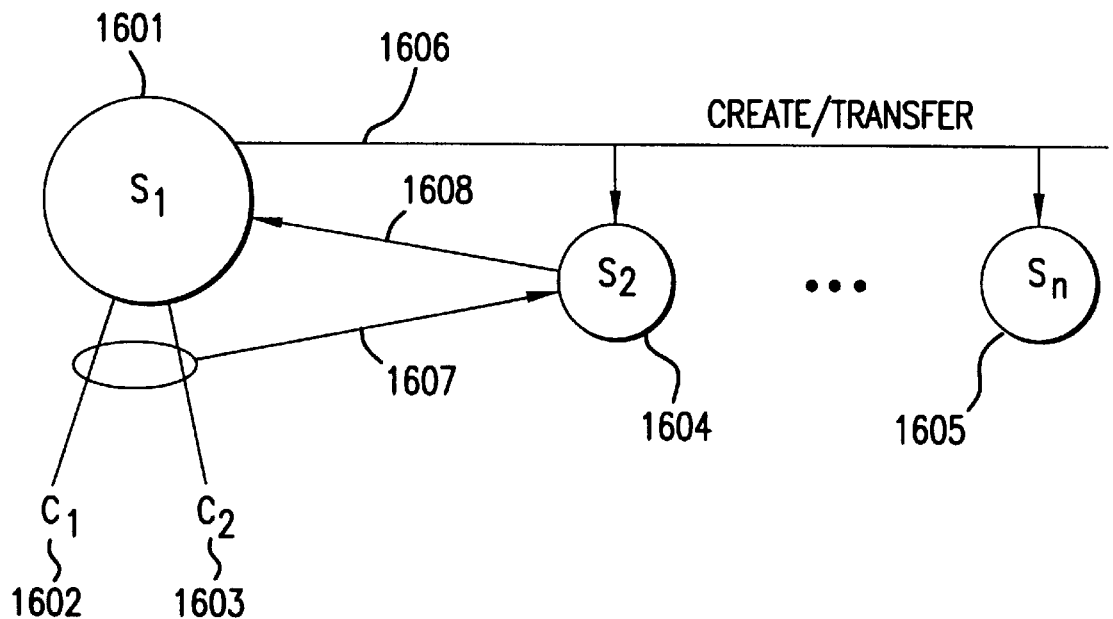
FIGS. 16A and 16B show an implementation of the invention using multiple servers.

FIG. 16A shows an example as contemplated by embodiments of the present invention in which multiple servers exchange clients while supporting the invention. Transferring clients to a separate server aids in controlling the load on the supporting network. As the number of required transmissions between clients increases significantly as the number of clients increases, partitioning clients onto different servers reduces the overall load on the network.

For example, if 10 users on 10 different platforms are involved in a game with each one performing an action which needs to be conveyed to the other users, then a central server would receive 10 actions and transmit 90 different messages (number of users transmitting actions (10)× number of users receiving each action (9)=90 different messages). The ramifications of having to send large numbers of actions grows at a geometric rate. Likewise, the load on the network supporting the various platforms increases geometrically as well. By separating the users from each other so that they all do not need to be updated with the actions of all other users greatly reduces the burden on the server and network. Specifically, and using the above example, by separating the users onto two different servers (as represented to the users by being in different self-contained rooms representing different games), then the total number of transmissions by the servers is 40 (number of users transmitting actions (5)× number of users receiving actions (4)× two separate groups of users (2)=40). Accordingly, one readily appreciates the reduction in bandwidth consumed by separating users' characters from each other and the respective clients onto separate servers.

Referring to FIG. 16A, server $S_1$ initially connects the various clients together and later transfers them to other servers. The servers transferred to may be distinct servers or may be created by server $S_1$ for the purpose of temporarily supporting a number of users. Here, clients $C_1$ 1602 and $C_2$ 1603 connect to server $S_1$ 1601 to take join with other actors to take part in multi-user games or equivalent. Once connection has been established, server $S_1$ determines if other servers are available and, if not, creates new servers for supporting the clients $C_1$ 1602 and $C_2$ 1603 as shown by step 1606. Once new servers are available ($S_2$ or $S_N$), server S transfers clients $C_1$ and $C_2$ to an available server for continuing support as shown in step 1607. Clients $C_1$ 1602 and $C_2$ 1603 carry out the invention as described above with server $S_2$ 1604. When clients $C_1$ 1602 and $C_2$ 1603 have completed their processing with server $S_2$ 1604, server $S_2$ 1604 transfers them back to server $S_1$ 1601 as shown by step 1608.

Figure 16B:
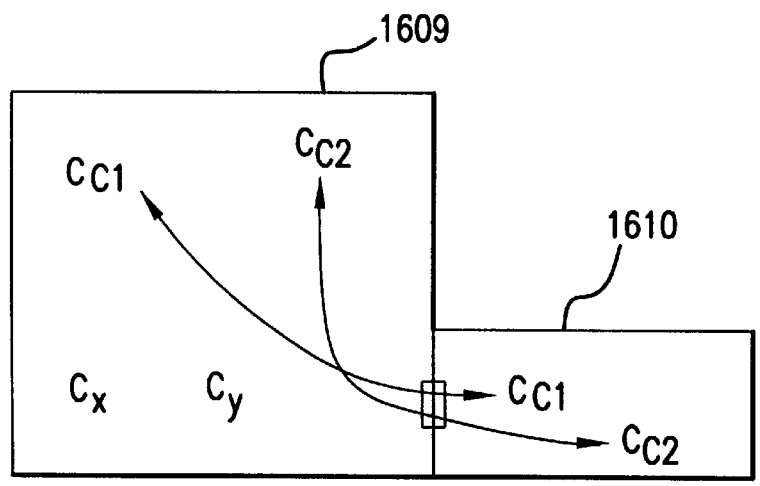

To clients $C_1$ 1602 and $C_2$ 1603, this exchange between servers appears seamless as shown by the following scenario illustrated in FIG. 16B. When client $C_1$ 1602 and $C_2$ 1603 initially enter a gaming hall, their character objects $C_{C1}$ and $C_{C2}$ are placed in a large room 1609 with other character objects $C_X$ and $C_Y$ (on server $S_1$ 1601). Next, characters $C_{C1}$ and $C_{C2}$ pick which specific type of game they want to play and enter a room supporting that game (e.g., room 1610). The door to the room 1610 is closed when the room contains the maximum number of characters allowed (in this example, two). Here, server $S_1$ 1601 creates or verifies the existence of other servers in step 1606 and transfers the clients $C_1$ and $C_2$ to a new server $S2$ 1604 in step 1607. Once one of the characters $C_{C1}$ seeks to leave the independently running game (e.g., room 1610) into which it was placed, it leaves and travels back to the large room 1609. Unknown to the clients, the server $S_2$ transfers client $C_1$ back to server $S_1$ 1601 in step 1608). Finally, all characters eventually leave the independent game (e.g., small room 1610). Here, server $S_2$ 1604 transfers the remaining client $C_{C2}$ back to server $S_1$ and server $S_2$ 1604 re-sets for new players entering into room 1610 (i.e., prepares for a new game).

Figure 17:
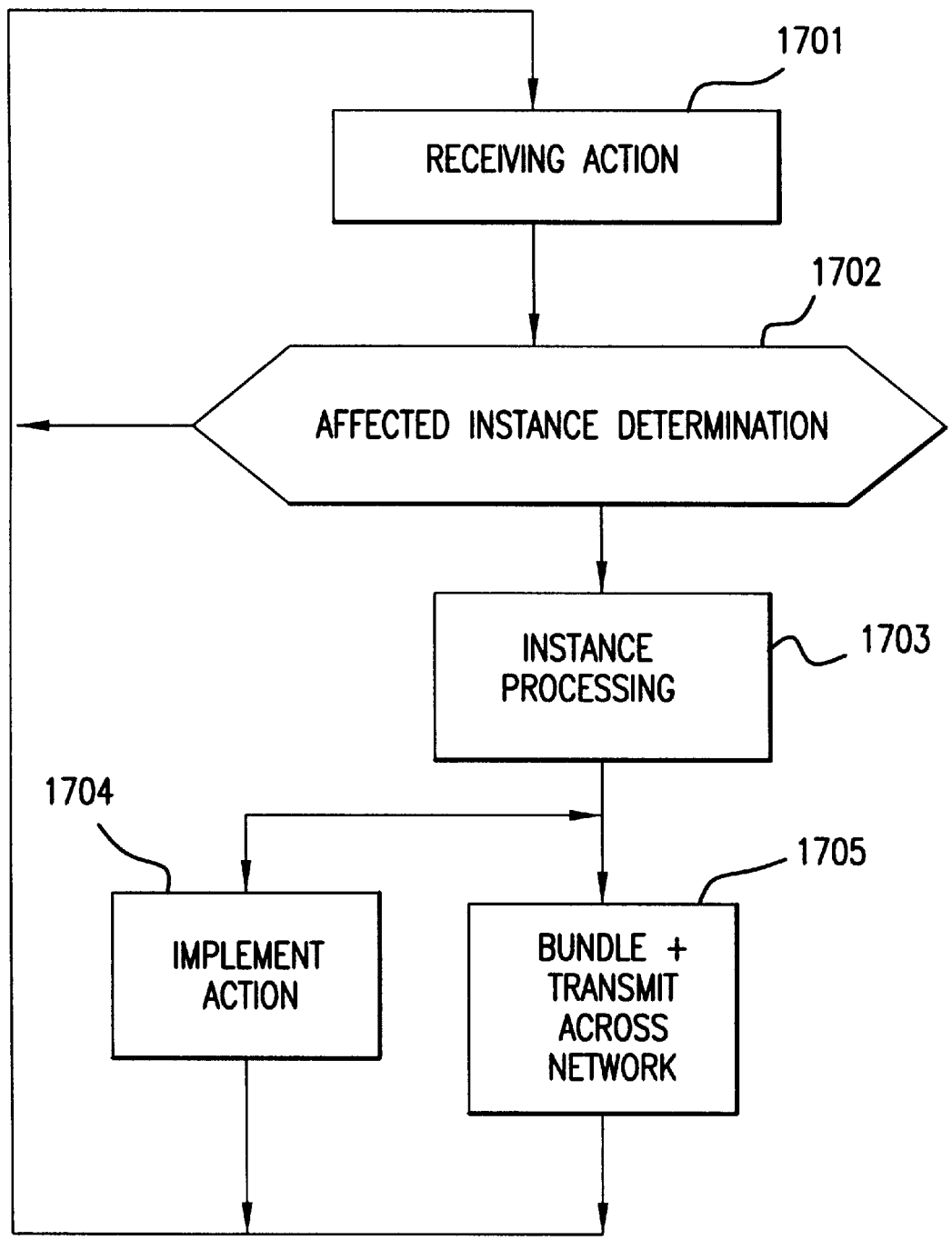
FIG. 17 shows an example of processing modules as contemplated by embodiments of the invention.

To implement the different actions received over the network, each platform runs a similar program. FIG. 17 illustrates the different processing modules of the program. The first processing module is the RECEIVING ACTION module 1701. It receives actions and messages from local and remote instances and places them in an action queue for ordering purposes. The output of the RECEIVING ACTION module 1701 feeds into the AFFECTED INSTANCE DETERMINATION module 1702.

The AFFECTED INSTANCE DETERMINATION module 1702 determines which instance is affected by the received action as well as checks to see whether the received action is usable by the affected instance. If the action is not usable, then module 1702 routes back to module 1701 to wait until a new action has been received. If the action is usable by the affected instance, then the output of module 1702 routes to INSTANCE PROCESSING module 1703. The AFFECTED INSTANCE DETERMINATION module 1702 acts as a filter in that it filters out all actions which cannot be implemented.

The INSTANCE PROCESSING module 1703 determines to what extent the received action affects the affected instance and directs the IMPLEMENT ACTION module 1704 to implement the action. If the implementation of the action requires other platforms to be informed of the change, then INSTANCE PROCESSING module 1703 commands BUNDLE AND TRANSMIT ACROSS NETWORK module 1705 to form and send the appropriate message to the other platforms. In the case of proxy instances, the INSTANCE PROCESSING module 1703 determines whether the state of the proxy will change in response to the received action. As may be required, INSTANCE PROCESSING module 1703 commands any combination of the IMPLEMENT ACTION module 1704 and the BUNDLE AND TRANSMIT ACROSS NETWORK module 1705. Finally, the program routes back to the RECEIVING ACTION module 1701 to await new actions. The INSTANCE PROCESSING module 1703 also may be considered as possessing a filtering-type function as it ignores what it cannot implement.

It should be noted that, in embodiments contemplated by the present invention, not all actions can be transmitted both locally and across a network to other platforms. FIG. 11A shows the "local" message sending matrix indicating which types of actions may be locally transmitted and later implemented. It indicates that master instances can transmit actions to all other types of instances including itself, other masters, proxies (other than itself), and free instances. Also, free instances can locally transmit actions to all other types of instances. Proxy instances transmit actions to itself and free instances.

FIG. 18A shows an embodiment where a master and its related proxy do not exist on the same platform. In this embodiment, as the information transferred with each message includes the location in memory of the representation of the instance, a master and its related proxy would occupy the same memory location and would not be able to command themselves uniquely. Alternatively, an alternate embodiment suggests that masters and their related proxies have different memory storage locations so as to allow a master and its related proxy to share the same platform.

FIG. 18B shows the "network" sending matrix indicating which types of actions may be transmitted across a network. It is important to note that free instances do not transmit actions across the network. Likewise, they do not receive actions from across the network. Rather, as all actions received from the network affect master and proxy instances directly and free instances indirectly, free instances are not indicated on the Network Sending Matrix of FIG. 18B. FIG. 18B indicates that all master instances may transmit to master and proxy instances across the network. Proxy instances do not transmit across the network except to convey received state-changing messages to their related masters, as discussed previously. As master instances and proxy instances do not send messages to themselves on the same platform by using the network, the sections of FIG. 18B which suggest an instance sending a message to itself across the network are marked "Not Applicable."

Figure 19:
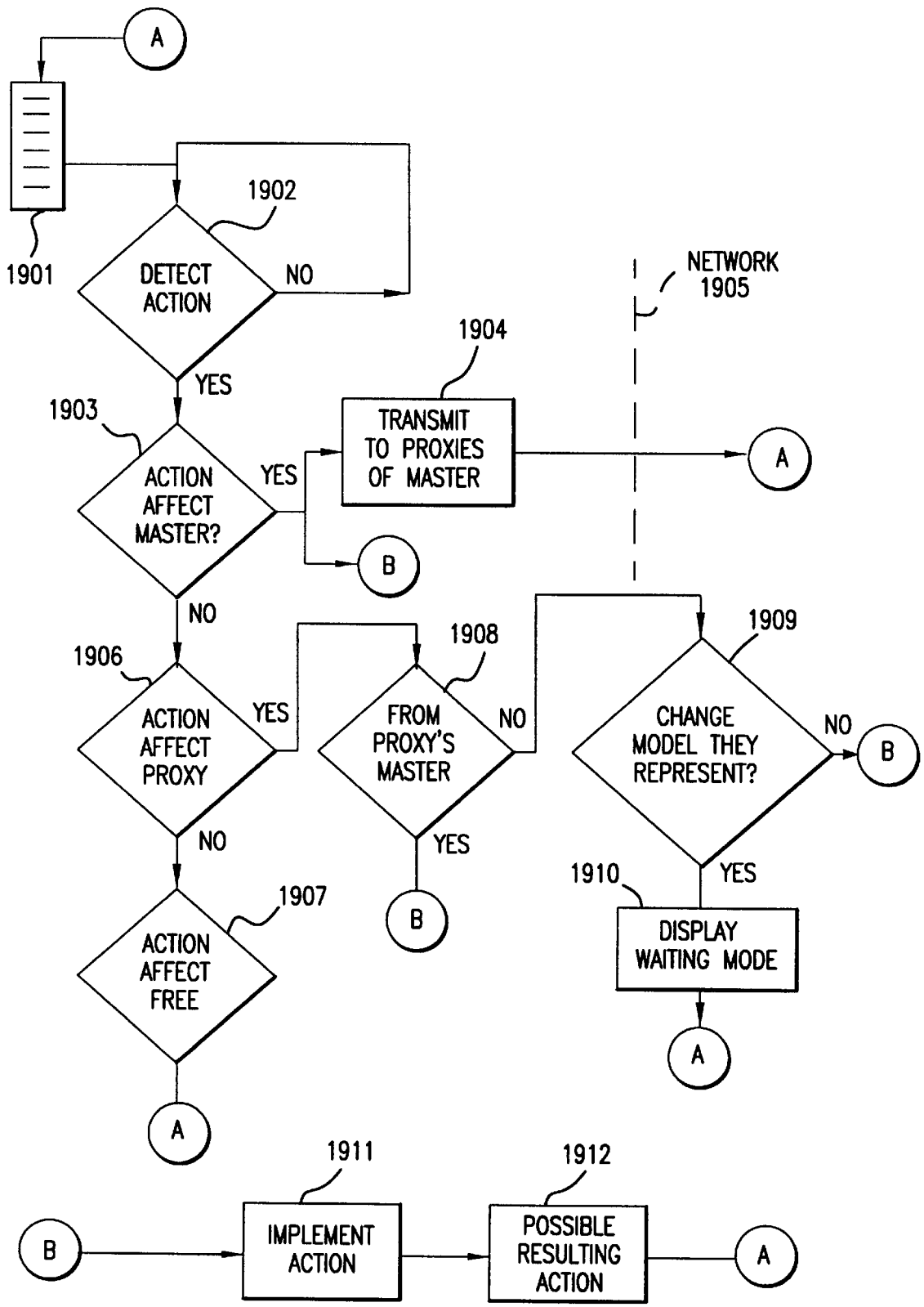
FIG. 19 shows a flow chart as contemplated by embodiments of the invention.

FIG. 19 shows a flow chart of an implementation of a method contemplated by embodiments of the present invention as viewed from a single platform. New actions are received and placed in action queue 1901 as represented by point "A." The actions are read out in a first in/first out (FIFO) fashion. The system waits until a new action has been detected in step 1902.

Once a new action has been detected, the next step is to determine whether the action affects a master instance in step 1903. If "yes", then the method implements step 1904 which transmits the resulting implementation of the action to the master's proxies. The dashed line 1905 indicates the transmission of a message across the network. The reception on the remote platform is shown by point "A" indicating that the one or more remote platforms receiving the transmission run a similar processing scheme as implemented on the instant platform. In addition to implementing step 1904, another set of steps starting at point "B" are implemented, which will be covered in greater detail below.

Referring back to step 1903, if the action does not affect a master instance, then the method checks in step 1906 whether the action affects a proxy instance. If "yes," it is determined step 1908 whether the action originated with the proxy's master. If "yes", then the processing steps as indicated at point "B" are implemented. If the action is not from the proxy's master, the method determines whether the action changes the proxy's state. If it does, then the waiting mode for the proxy instance is implemented in step 1910. Next, the method loops back to the input queue as shown by step "A." Otherwise, the processing proceeds to step "B."

If the action does not affect the proxy instance as determined in step 1906, then the system determines whether the action affects a free instance in step 1907. If "yes", then the system proceeds to point "B." Otherwise, the action is ignored and the system again waits for new actions at point "A."

Point "B" involves the following processing steps. First, implement the received action as shown in step 1911, determine whether a resulting action is required and, if so, initiate the action in step 1912. Then, return to processing point "A."

Figure 20:
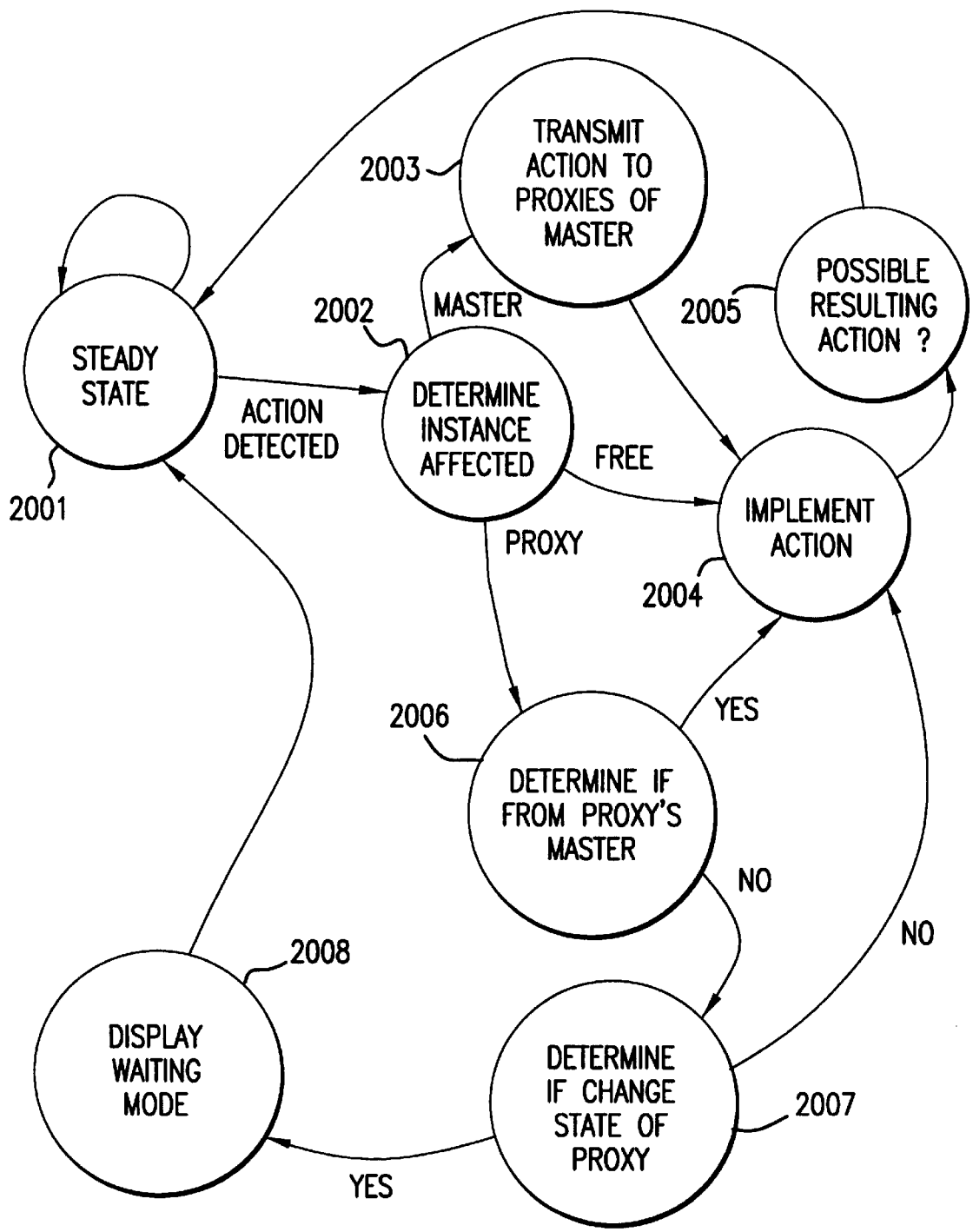
FIG. 20 shows a state diagram as contemplated by embodiments of the invention.

FIG. 20 shows a state diagram of an implementation of the invention on a platform. When waiting for an action, the system is in a steady state as represented by state 2001. Once an action is detected, state 2002 is reached where it is determined which instance is affected. If a master instance is affected, the action is transmitted to proxies of the master as shown by state 2003. Next, the action is implemented in sate 2004. Next, state 2005 is reached where it is determined whether a resulting action is required and, if so, the action is initiated. Finally, the system returns to steady state 2001.

If the instance affected is a free instance, the system moves from state 2002 to state 2004 where the action is implemented. The system changes to state 2005 as described above then to state 2001.

If the instance affected a proxy instance, then the system shifts to state 2006 where it determines if the action is from the proxy's master. If so, then it shifts to state 2004 and implements the action as describe above. If the action is not from the proxy's master, then the system shifts to state 2007 where the system determines whether the change will affect the state of the instance it represents. If the proxy's state will change, then the system shifts to state 2008 where the proxy assumes a waiting state. Next, the system shifts back to steady state 2001. If the proxy's state will not change, then the system shifts to state 2004 where it implements the action and eventually returns to steady state 2001.

Of course, it should be understood that the configuration of the modules discussed above is merely by way of example, and that it is contemplated that other configurations and additional (or less) modules could also have been implemented.

In general, it should be emphasized that the various components of embodiments of the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention. For example, at least some of the functionality mentioned above could be implemented using the C or C++ programming language.

It is also to be appreciated and understood that the specific embodiments of the invention described hereinbefore are merely illustrative of the general principles of the invention. Various modifications may be made by those skilled in the art consistent with the principles set forth hereinbefore.

We claim:

1. A computer-implemented method for controlling the updating of local and remote information, wherein information is one of at least two responsivity types, the local information being selectively responsive to one or more actions occurring at a first remote location, comprising the steps of:

receiving an indication of the occurrence of an action from the first remote location;

based on the action and the responsivity type of the local information, determining whether said action is an action that the local information is selectively responsive to; and in affirmative response to said determining step:

implementing said action, thereby updating the local information and causing one or more associated results to locally occur; and selectively transmitting said action to a second remote location based on the type of the local information thereby updating the second remote information and causing said one or more associated results at said second remote location to occur.

2. The computer-implemented method of claim 1, wherein said receiving step includes reading the action from an input queue.

3. The computer-implemented method of claim 1, wherein said responsivity types include controller information, mirror information or independent information.

4. The computer-implemented method of claim 3, wherein the local information is controller information and wherein the method further comprises the steps of:

determining whether the action affects said local controller information; and, in affirmative response thereto, locally implementing the action on said local controller information and transmitting the action to remote mirror information related to said local controller information wherein said remote mirror information resides on a remote location.

5. The computer-implemented method of claim 3, wherein the local information is mirror information and wherein the method further comprises the steps of:

determining whether the action affects said local mirror information; and, in affirmative response thereto, performing the step of:

determining whether the action originates from remote controller information related to said local mirror information and, in affirmative response thereto, performing the action on said local mirror information.

6. The computer-implemented method of claim 5, further comprising the steps of:

in negative response to said step for determining whether the action originates from remote controller information, determining whether the action would change said related controller information and in affirmative response thereto transmitting the action to said related controller information at a remote location having the related controller information.

7. The computer-implemented method of claim 6, further comprising the steps of:

receiving at said remote location having the related controller information the action;

performing said action on said controller information, and creating a second action;

transmitting the second action to said related mirror information; and, performing said second action on said mirror information.

8. The computer-implemented method of claim 3, further comprising the steps of:

determining whether the action affects said independent information; and, in affirmative response thereto, locally performing the action on said independent information.

9. The computer-implemented method of claim 3, wherein the controller information is a master instance.

10. The computer-implemented method of claim 3, wherein the mirror information is a proxy instance.

11. The computer-implemented method of claim 3, wherein the independent information is a free instance.

12. The computer-implemented method of claim 1, wherein said receiving step receives said indication over a network using a TCP/IP protocol.

13. The computer-implemented method of claim 1, wherein said receiving step receives said indication over a network using an IP/IPX protocol.

14. The computer-implemented method of claim 1, wherein said receiving step receives said indication over a network using AppleTalk protocol.

15. The computer-implemented method of claim 1, wherein the action is accompanied by location information indicating the location of said first information in a memory.

16. The computer-implemented method of claim 1, wherein the action is accompanied by header information indicating that the action generally relates to a category of actions which may affect said first information.

17. The computer-implemented method of claim 1, wherein the action is accompanied by identification information identifying the identify of said second information.

18. The computer-implemented method of claim 1, further comprising the step of:

in response to said step of selectively transmitting, implementing the action on remote controller information and mirror information.

19. The computer-implemented method of claim 18, wherein the mirror information includes mirror information related to the local information and mirror information unrelated to the local information.

20. A system for controlling the updating of local and remote information, wherein information is one of at least two responsivity types the local information being selectively responsive to one or more actions occurring at a first remote location, comprising:

a receiver for receiving an action;

a filter responsive to the responsivity type of the local information, passing the action when said action is one of the one or more actions that the local information is selectively responsive to; and a processor processing the action passed by said filter, said processor processing the action by at least one of updating the local information and causing one or more associated results to locally occur and transmitting said action to a remote location, thereby updating the remote information and causing said one or more associated results at said second remote location to occur.

21. The system according to claim 20, further comprising a memory and wherein the action is accompanied by location information indicating the location of said first information in said memory.

22. The system according to claim 20, wherein the responsivity types include controller information, mirror information, and independent information.

23. The system according to claim 22, wherein said processor processes the action, in response to the action affecting the controller information, by implementing the action on the controller information and transmitting the action to related mirror information at a remote location.

24. The system according to claim 22, wherein said processor processes the action, in response to the action affecting the independent information, by implementing the action on the independent information.

25. The system according to claim 22, further comprising a determinator which, when the action affects the mirror information, determines whether the action originates from related controller information and, in affirmative response thereto, allows said processor to implement the action on the mirror information.

26. The system according to claim 25, wherein, in negative response to the determination of said determinator, said processor transmits the action to the related controller information at said remote location.

27. The system for updating information, according to claim 22, wherein said filter filters out actions from mirror information affecting at least one of unrelated controller information and mirror information.

28. The system according to claim 22, wherein the controller information is a master instance.

29. The system according to claim 22, wherein the mirror information is a proxy instance.

30. The system according to claim 22, wherein the independent information is a free instance.

31. The system according to claim 20, wherein said receiver receives said indication over a network using a TCP/IP protocol.

32. The system according to claim 20, wherein said receiver receives said indication over a network using an IP/IPX protocol.

33. The system according to claim 20, wherein said receiver receives said indication over a network using AppleTalk protocol.

34. The system according to claim 20, wherein the action is accompanied by header information indicating that the action generally relates to a category of actions which may affect said first information.

35. The system according to claim 20, wherein the action is accompanied by identification information identifying the identify of said second information.

36. A computer-readable medium having computer-processable program logic for controlling the updating of local and remote information, wherein information is one of at least two responsivity types, the local information being selectively responsive to one or more actions occurring at a first remote location comprising:
a first module for receiving an indication of the occurrence of an action from the first remote location;
a second module, responsive to the action and the responsivity type of the local information, for determining whether said action is one of the one or more actions that the local information is selectively responsive to; and
a third module for implementing said action, in response to affirmative response from the second module thereby updating the local information and causing one or more associated results to locally occur; and a fourth module for transmitting the implementation of said action to a remote location, in response to affirmative response from the second module thereby updating the remote information and causing said one or more associated results at said second remote location to occur.

37. The computer-readable medium of claim 36, wherein said first module reads the action from an input queue.

38. The computer-readable medium of claim 36, wherein said responsivity types include controller information, mirror information or independent information.

39. The computer-readable medium of claim 38, further comprising:
a fifth module for determining whether the action affects said controller information; and,
in affirmative response thereto, a fifth module for locally performing the action on said controller information and a sixth module for transmitting the action to mirror information related to said controller information wherein said mirror information resides on said remote location.

40. The computer-readable medium of claim 38, further comprising:
a fifth module for determining whether the action affects said mirror information; and,
in affirmative response thereto, a sixth module for determining whether the action originates from controller information related to said mirror information and, in affirmative response thereto, a seventh module for performing the action on said mirror information.

41. The computer-readable medium of claim 40, further comprising:
in negative response to said sixth module, an eighth module for determining whether the action would change said related controller information and, in affirmative response to said eighth module, a ninth module for transmitting the action to said related controller information at said remote location.

42. The computer-readable medium of claim 41, further comprising:
in negative response to said eighth module, a tenth module for implementing the action on said mirror information.

43. The computer-readable medium of claim 42, further comprising:
an eleventh module for receiving the action at said remote location having said related controller information;
a twelfth module for performing said action on said controller information, said twelfth module creating a second action;
a thirteenth module for transmitting the second action to said mirror information; and
a fourteenth module for performing said second action on said mirror information.

44. The computer-readable medium of claim 38, further comprising the steps of:
a fifth module for determining whether the action affects said independent information; and, in affirmative response thereto, a sixth module for locally performing the action on said independent information.

45. The computer-readable medium of implemented method of claim 38, wherein the controller information is a master instance.

46. The computer-readable medium of implemented method of claim 38, wherein the mirror information is a proxy instance.

47. The computer-readable medium of implemented method of claim 38, wherein the independent information is a free instance.

48. The computer-readable medium of claim 36, wherein the occurrence of the action is accompanied by location information indicating the location of said local information in a memory.

49. The computer-readable medium of claim 36, wherein the occurrence of the action is accompanied by header information indicating that the action generally relates to a category of actions which may affect said local information.

50. The computer-readable medium of claim 36, wherein the occurrence of action is accompanied by identification information identifying the identify of said recognized remote information.

51. A computer-implemented method of communicating a change in first information from a first location including first information to at least a second location having second information, wherein the second information is related to the first information, wherein the first information includes proxy information and free information, comprising the steps of:
 monitoring at said first location for an action affecting said master information;
 performing the action on the master information, the effect of the action constituting a change in the master information;
 determining at said first location whether the change in the master information affects the free information at said first location;
 altering the free information at said first location in accordance with said change in the master information;
 transmitting the action to said second location;
 performing the action on the proxy information the effect being a change in the proxy information;
 determining at said second location whether the change in the proxy information affects the free information at said second location; and
 altering the free information at said second location in accordance with said change in the proxy information.

52. A computer-implemented method for controlling the updating of local and remote information, wherein information is one of at least two responsivity types, the local information being selectively responsive to one or more actions occurring at a first remote location, comprising the steps of:
 receiving an indication of the occurrence of an action from the first remote location;
 based on the action and the responsivity type of the local information determining whether said action is an action that the local information is selectively responsive to; and
 in affirmative response to said determining step:
  determining whether said action affects the state of the local information, and,
  in affirmative response to said step for determining whether said state of the local information is affected:
   transmitting said action to a second remote location, thereby notifying remote information at said second remote location that the local information has received said action which affects the state of the local information.

53. A computer-implemented method according to claim 52, further comprising the step of:

in negative response to said step for determining whether said state of the local information is affected,
 implementing said action, thereby updating the local information and causing one or more associated results to locally occur.

54. The computer-implemented method of claim 52, wherein said receiving step includes reading the action from an input queue.

55. The computer-implemented method of claim 52, wherein said responsivity types include controller information, mirror information or independent information.

56. The computer-implemented method of claim 55, further comprising the steps of:
 determining whether the action affects said controller information; and, in affirmative response thereto, performing the steps of:
  locally performing the action on said controller information and
  transmitting the action to mirror information related to said controller information wherein said mirror information resides on a remote location.

57. The computer-implemented method claim 55, further comprising the steps of:
 determining whether the action affects said mirror information; and, in affirmative response thereto, performing the step of:
  determining whether the action originates from controller information related to said mirror information; and, in affirmative response thereto,
  performing the action on said mirror information.

58. The computer-implemented method of claim 57, further comprising the steps of:
 in negative response to said step for determining whether the action originates from controller information,
 determining whether the action would change said related controller information and, in affirmative response to said step for determining whether said controller information would change,
 transmitting the action to said related controller information at a remote location.

59. The computer-implemented method of claim 58, further comprising the step of:
 in negative response to said step for determining whether said controller information would change,
 implementing the action on said mirror information.

60. The computer-implemented method of claim 58, further comprising the steps of:
 receiving the action at said remote location having said related controller information;
 performing said action on said controller information, said step (12) creating a second action;
 transmitting the second action to said mirror information; and,
 performing said second action on said mirror information.

61. The computer-implemented method of claim 55, further comprising the steps of:
 determining whether the action affects said independent information; and, in affirmative response thereto, performing the step of:
  locally performing the action on said mirror information.

62. The computer-implemented method of claim 55, wherein the controller information is a master instance.

63. The computer-implemented method of claim 55, wherein the mirror information is a proxy instance.

64. The computer-implemented method of claim 55, wherein the independent information is a free instance.

65. A computer-readable medium having computer-processable information for forming a distributed application to execute on multiple platforms, comprising a first distributed object, having
- a first master instance, residing and executable on a first platform;
- a first proxy instance, related to the first master instance and residing and
- executable on a second platform;

a second distributed object having a model state representative of the object and having
- a second master instance, residing and executable on a second platform, wherein the second master instance includes logic to respond to messages involving changes to the model state of the second distributed object and logic for transmitting the message to the second proxy instance;
- a second proxy instance, related to the second master instance and residing and executable on a first platform, wherein the second proxy instance includes logic for receiving messages from the first master instance, logic for determining whether responding to the message involves a change to the model state of the second distributed object and, if so, for transmitting the message to the second master instance, and logic for receiving and responding to messages from the second master instance involving changes to the second proxy instance.

66. The computer-readable medium of claim 65 further comprising a free instance residing on the first platform and responsive to messages from instances on the first platform only.

\* \* \* \* \*